US012205606B2

(12) United States Patent
Ghido et al.

(10) Patent No.: US 12,205,606 B2
(45) **Date of Patent: *Jan. 21, 2025**

(54) CONTEXT-BASED ENTROPY CODING OF SAMPLE VALUES OF A SPECTRAL ENVELOPE

(71) Applicant: Fraunhofer-Gesellschaft zur Foerderung der angewandten Forschung e.V., Munich (DE)

(72) Inventors: Florin Ghido, Nuremberg (DE); Andreas Niedermeier, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,986

(22) Filed: Sep. 11, 2023

(65) Prior Publication Data

US 2024/0079020 A1 Mar. 7, 2024

Related U.S. Application Data

(63) Continuation of application No. 17/571,237, filed on Jan. 7, 2022, now Pat. No. 11,790,927, which is a (Continued)

(30) Foreign Application Priority Data

Jul. 22, 2013 (EP) .................................... 13177351
Oct. 18, 2013 (EP) .................................... 13189336

(51) Int. Cl.
*G10L 19/06* (2013.01)
*G10L 19/00* (2013.01)
(Continued)

(52) U.S. Cl.
CPC .............. *G10L 19/06* (2013.01); *G10L 19/00* (2013.01); *G10L 19/02* (2013.01);
(Continued)

(58) Field of Classification Search
CPC ................................ G10L 19/06; G10L 19/02
See application file for complete search history.

(56) References Cited

U.S. PATENT DOCUMENTS 6,128,351 A 10/2000 Jones et al.
6,978,236 B1 12/2005 Liljeryd et al.
(Continued)

FOREIGN PATENT DOCUMENTS

AU 2585700 A 8/2000
CN 1194749 A 9/1998
(Continued)

OTHER PUBLICATIONS

Edler, B., et al., "Improved Quantization and Lossless Coding for Subband Audio Coding", AES 118th Convention.
(Continued)

*Primary Examiner* — Shaun Roberts
(74) *Attorney, Agent, or Firm* — Perkins Coie LLP; Michael A. Glenn

(57) ABSTRACT

An improved concept for coding sample values of a spectral envelope is obtained by combining spectrotemporal prediction on the one hand and context-based entropy coding the residuals, on the other hand, while particularly determining the context for a current sample value dependent on a measure of a deviation between a pair of already coded/decoded sample values of the spectral envelope in a spectrotemporal neighborhood of the current sample value. The combination of the spectrotemporal prediction on the one hand and the context-based entropy coding of the prediction residuals with selecting the context depending on the devia-
(Continued)

tion measure on the other hand harmonizes with the nature of spectral envelopes.

16 Claims, 13 Drawing Sheets

Related U.S. Application Data continuation of application No. 16/918,835, filed on Jul. 1, 2020, now Pat. No. 11,250,866, which is a continuation of application No. 15/923,643, filed on Mar. 16, 2018, now Pat. No. 10,726,854, which is a continuation of application No. 15/000,844, filed on Jan. 19, 2016, now Pat. No. 9,947,330, which is a continuation of application No. PCT/EP2014/065173, filed on Jul. 15, 2014.

(51) Int. Cl.

| | |
|---|---|
| ***G10L 19/02*** | (2013.01) |
| ***G10L 19/028*** | (2013.01) |
| ***G10L 19/032*** | (2013.01) |
| ***G10L 19/038*** | (2013.01) |
| ***G10L 21/038*** | (2013.01) |

(52) U.S. Cl.

CPC ........ *G10L 19/0204* (2013.01); *G10L 19/028* (2013.01); *G10L 19/032* (2013.01); *G10L 19/038* (2013.01); *G10L 21/038* (2013.01)

(56) References Cited

U.S. PATENT DOCUMENTS

| | | | |
|---|---|---|---|
| 8,392,176 | B2 | 3/2013 | Garudadri et al. |
| 8,892,449 | B2 | 11/2014 | Lecomte et al. |
| 9,978,380 | B2 | 5/2018 | Fuchs et al. |
| 2003/0233234 | A1 | 12/2003 | Truman et al. |
| 2004/0078194 | A1 | 4/2004 | Liljeryd et al. |
| 2004/0225496 | A1 | 11/2004 | Bruekers et al. |
| 2005/0053242 | A1 | 3/2005 | Henn et al. |
| 2005/0165611 | A1 | 7/2005 | Mehrotra et al. |
| 2007/0124136 | A1 | 5/2007 | Den Brinker et al. |
| 2008/0027717 | A1 | 1/2008 | Rajendran et al. |
| 2008/0262853 | A1 | 10/2008 | Jung et al. |
| 2009/0099844 | A1 | 4/2009 | Reznik et al. |
| 2009/0177478 | A1 | 7/2009 | Jax et al. |
| 2010/0324912 | A1 | 12/2010 | Choo et al. |
| 2011/0173006 | A1 | 7/2011 | Nagel et al. |
| 2011/0173007 | A1 | 7/2011 | Multrus et al. |
| 2011/0178795 | A1 | 7/2011 | Bayer et al. |
| 2011/0202355 | A1 | 8/2011 | Grill et al. |
| 2011/0238426 | A1 | 9/2011 | Fuchs et al. |
| 2012/0016667 | A1 | 1/2012 | Gao |
| 2012/0143599 | A1 | 6/2012 | Seltzer et al. |
| 2016/0099005 | A1 | 4/2016 | Liljeryd |
| 2016/0138464 | A1 | 5/2016 | Lallemant et al. |
| 2020/0395026 | A1 | 12/2020 | Ghido et al. |

FOREIGN PATENT DOCUMENTS

| | | | |
|---|---|---|---|
| CN | 1272259 | A | 11/2000 |
| CN | 101180677 | A | 5/2008 |
| CN | 101185126 | A | 5/2008 |
| CN | 102089811 | A | 6/2011 |
| CN | 102177543 | A | 9/2011 |
| CN | 102568484 | A | 7/2012 |
| JP | 2002536679 | A | 10/2002 |
| JP | 2003529787 | A | 10/2003 |
| JP | 2005530205 | A | 10/2005 |
| JP | 2006047561 | A | 2/2006 |
| JP | 2006065342 | A | 3/2006 |
| JP | 2009205085 | A | 9/2009 |
| JP | 2011527447 | A | 10/2011 |
| JP | 2012531086 | A | 12/2012 |
| JP | 2013508762 | A | 3/2013 |
| JP | 2016528422 | A | 9/2016 |
| RU | 2011104002 | A | 8/2012 |
| TW | 201205558 | A | 2/2012 |
| WO | F0045379 | | 8/2000 |
| WO | 2008084427 | A2 | 7/2008 |
| WO | 2009039451 | A2 | 3/2009 |
| WO | 2010003479 | A1 | 1/2010 |
| WO | 2010003618 | A2 | 1/2010 |
| WO | 2012165910 | A2 | 12/2012 |
| WO | 2015010966 | A1 | 1/2015 |

OTHER PUBLICATIONS

ISO/IEC , "Information technology—Coding of audio-visual objects/Part 3: Audio", , 1178 pages.

ISO/IEC JTC 1, "Information Technology—MPEG Audio Technologies—Part 3: Unified Speech and Audio Coding", 286 pages.

Quackenbush, S. R., et al., "Noiseless Coding of Quantized Spectral Components in MPEG-2 Advanced Audio Coding", S. R. Quackenbush et al., Noiseless coding of quantized spectral components in MPEG-2 Advanced Audio Coding, 1997 IEEE ASSP Workshop on Applications of Signal Processing to Audio and Acoustics, 1997, 1997, 1-4.

Thyssen, Jes, et al., "A Candidate for the ITU-T 4 Kbit/S Speech Coding Standard", 2001.

Wang, Jing, et al., "Context-based adaptive arithmetic coding in time and frequency domain for the lossless compression of audio coding parameters at variable rate", EURASIP Journal on Audio, Speech, and Music Processing Retrieved from the Internet: URL: http://asmp.eurasipjournals.com/content/pdf/1687-4722-2013-9.pdf [retrieved on Feb. 26, 2014] section 2.2, 2.3, p. 1.

Weinberger, M. J., et al., "The LOCO-I Lossless Image Compression Algorithm: Principles and Standardization into JPEG-LS", Available online at http://www.hpl.hp.com/research/info_theory/loco/HPL-98-193R1.pdf, 1999, pp. 1-34.2

CONTEXT-BASED ENTROPY CODING OF SAMPLE VALUES OF A SPECTRAL ENVELOPE

CROSS-REFERENCE TO RELATED APPLICATIONS

This application is a continuation of copending U.S. patent application Ser. No. 17/571,237 filed Jan. 7, 2022, which is a continuation of U.S. patent application Ser. No. 16/918,835 filed Jul. 1, 2020, which is a continuation of U.S. patent application Ser. No. 15/923,643 filed Mar. 16, 2018, which in turn is a continuation of U.S. patent application Ser. No. 15/000,844, filed 10 Jan. 19, 2016, which in turn is a continuation of International Application No. PCT/EP2014/065173, filed Jul. 15, 2014, which is incorporated herein by reference in its entirety, and additionally claims priority from European Application No. EP13177351, filed Jul. 22, 2013, and from European Application No. EP13189336, filed Oct. 18, 2013, which are also incorporated herein by reference in their entirety.

BACKGROUND OF THE INVENTION

The present application is concerned with context-based entropy coding of sample values of a spectral envelope and the usage thereof in audio coding/compression.

Many modern state of the art lossy audio coders such as described in [1] and [2] are based on an MDCT transform and use both irrelevancy reduction and redundancy reduction to minimize the bitrate that may be used for a given perceptual quality. Irrelevancy reduction typically exploits the perceptual limitations of the human hearing system in order to reduce the representation precision or remove frequency information that is not perceptually relevant. Redundancy reduction is applied to exploit the statistical structure or correlation in order to achieve the most compact representation of the remaining data, typically by using statistical modeling in conjunction with entropy coding.

Among others, parametric coding concepts are used to efficiently code audio content. Using parametric coding, portions of the audio signal such as, for example, portions of the spectrogram thereof, are described using parameters rather than using actual time domain audio samples or the like. For example, portions of the spectrogram of an audio signal may be synthesized at the decoder side with the data stream merely comprising parameters such as the spectral envelope and optional further parameters controlling synthesizing, in order to adapt the synthesized spectrogram portion to the spectral envelope transmitted. A new technique of such kind is Spectral Band Replication (SBR) according to which a core codec is used to code and transmit the low frequency component of an audio signal, whereas a transmitted spectral envelope is used at the decoding side so as to spectrally shape/form spectral replications of a reconstruction of the low frequency band component of the audio signal so as to synthesize the high frequency band component of the audio signal at the decoding side.

A spectral envelope within the framework of coding techniques outlined above, is transmitted within a data stream at some suitable spectrotemporal resolution. In a way similar to the transmission of spectral envelope sample values, scale factors for scaling spectral line coefficients or frequency domain coefficients such as MDCT coefficients, are likewise transmitted in some suitable spectrotemporal resolution which is coarser than the original spectral line resolution, coarser for example in a spectral sense.

A fixed Huffman coding table could be used in order to convey information on the samples describing a spectral envelope or scale factors or frequency domain coefficients. An improved approach is to use context coding such as, for example, described in [2] and [3], where the context used to select the probability distribution for encoding a value extends both across time and frequency. An individual spectral line such as an MDCT coefficient value, is the real projection of a complex spectral line and it may appear somewhat random in nature even when the magnitude of the complex spectral line is constant across time, but the phase varies from one frame to the next. This involves a quite complex scheme of context selection, quantization, and mapping for good results as described in [3].

In image coding, the contexts used are typically two-dimensional across the x and y axis of an image such as, for example, in [4]. In image coding, the values are in the linear domain or the power-law domain, such as for example by use of gamma adjustment. Additionally, a single fixed linear prediction may be used in each context as a plane fitting and rudimentary edge detection mechanism, and the prediction error may be coded. Parametric Golomb or Golomb-Rice coding may be used for coding the prediction errors. Run length coding is additionally used to compensate for the difficulties of directly encoding very low entropy signals, below 1 bit per sample, for example, using a bit based coder.

However, despite the improvements in connection with the coding of scale factors and/or spectral envelopes, there is still need for an improved concept for coding sample values of a spectral envelope. Accordingly, it is an object of the present invention to provide a concept for coding spectral values of a spectral envelope.

SUMMARY

An embodiment may have a context-based entropy decoder for decoding sample values of a spectral envelope of an audio signal, configured to spectrotemporally predict a current sample value of the spectral envelope to obtain an estimated value of the current sample value; determine a context for the current sample value dependent on a measure for a deviation between a pair of already decoded sample values of the spectral envelope in a spectrotemporal neighborhood of the current sample value; entropy decode a prediction residual value of the current sample value using the context determined; and combine the estimated value and the prediction residual value to obtain the current sample value.

According to another embodiment, a parametric decoder may have: a context-based entropy decoder for decoding sample values of a spectral envelope of an audio signal, configured to spectrotemporally predict a current sample value of the spectral envelope to obtain an estimated value of the current sample value; determine a context for the current sample value dependent on a measure for a deviation between a pair of already decoded sample values of the spectral envelope in a spectrotemporal neighborhood of the current sample value; entropy decode a prediction residual value of the current sample value using the context determined; and combine the estimated value and the prediction residual value to obtain the current sample value, a fine structure determiner configured to determine a fine structure of a spectrogram of the audio signal; and a spectral shaper configured to shape the fine structure according to the spectral envelope.

Yet another embodiment may have a context-based entropy encoder for encoding sample values of a spectral envelope of an audio signal, configured to spectrotemporally predict a current sample value of the spectral envelope to obtain an estimated value of the current sample value; determine a context for the current sample value dependent on a measure for a deviation between a pair of already decoded sample values of the spectral envelope in a spectrotemporal neighborhood of the current sample value; determine a prediction residual value based on a deviation between the estimated value and the current sample value; and entropy encode the prediction residual value of the current sample value using the context determined.

According to another embodiment, a method for, using context-based entropy decoding, decoding sample values of a spectral envelope of an audio signal, may have the steps of: spectrotemporally predicting a current sample value of the spectral envelope to obtain an estimated value of the current sample value; determining a context for the current sample value dependent on a measure for a deviation between a pair of already decoded sample values of the spectral envelope in a spectrotemporal neighborhood of the current sample value; entropy decoding a prediction residual value of the current sample value using the context determined; and combining the estimated value and the prediction residual value to obtain the current sample value.

According to yet another embodiment, a method for, using context-based entropy encoding, encoding sample values of a spectral envelope of an audio signal, may have the steps of: spectrotemporally predict a current sample value of the spectral envelope to obtain an estimated value of the current sample value; determining a context for the current sample value dependent on a measure for a deviation between a pair of already decoded sample values of the spectral envelope in a spectrotemporal neighborhood of the current sample value; determining a prediction residual value based on a deviation between the estimated value and the current sample value; and entropy encoding the prediction residual value of the current sample value using the context determined.

According to yet another embodiment, a non-transitory digital storage medium may have a computer program stored thereon to perform the inventive methods, when said computer program is run by a computer.

Embodiments described herein are based on the finding that an improved concept for coding sample values of a spectral envelope may be obtained by combining spectrotemporal prediction on the one hand and context-based entropy coding the residuals, on the other hand, while particularly determining the context for a current sample value dependent on a measure for a deviation between a pair of already coded/decoded sample values of the spectral envelope in a spectrotemporal neighborhood of the current sample value. The combination of the spectrotemporal prediction on the one hand and the context-based entropy coding of the prediction residuals with selecting the context depending on the deviation measure on the other hand harmonizes with the nature of spectral envelopes: the smoothness of the spectral envelope results in compact prediction residual distributions so that the spectrotemporal intercorrelation is almost completely removed after the prediction and may be disregarded in the context selection with respect to the entropy coding of the prediction result. This, in turn, lowers the overhead for managing the contexts. The use of the deviation measure between already coded/decoded sample values in the spectrotemporal neighborhood of the current sample value, however, still enables the provision of a context-adaptivity which improves the entropy coding efficiency in a manner which justifies the additional overhead caused thereby.

In accordance with embodiments described hereinafter, linear prediction is combined with the use of the difference value as the deviation measure, thereby keeping the overhead for the coding low.

In accordance with an embodiment, the position of the already coded/decoded sample values used to determine the difference value finally used to select/determine the context is selected such that they neighbor each other, spectrally or temporally, in a manner co-aligned with the current sample value, i.e. they lie along one line in parallel to temporal or spectral axis, and the sign of the difference value is additionally taken into account when determining/selecting the context. By this measure, a kind of "trend" in the prediction residual can be taken into account when determining/selecting the context for the current sample value while merely reasonably increasing the context managing overhead.

BRIEF DESCRIPTION OF THE DRAWINGS

Embodiments of the present invention will be detailed subsequently referring to the appended drawings, in which.

DETAILED DESCRIPTION OF THE INVENTION

As a kind of motivation of the embodiments outlined herein below, which are generally applicable to the coding of a spectral envelope, some thoughts which lead to the advantageous embodiments outlined below are presented now using Intelligent Gap Filling (IGF) as an example. IGF is a new method to significantly improve the quality of an encoded signal even at very low bitrates. Reference is made to the description below for details. In any case, IGF addresses the fact that a significant part of a spectrum in the high frequency region is quantized to zero due to typically insufficient bit budget. In order to preserve as well as possible the fine structure of the upper frequency region, in IGF information in the low frequency region is used as a source to adaptively replace the destination regions in the high frequency region which were mostly quantized to zero. An important requirement in order to achieve a good perceptual quality is matching of the decoded energy envelope of the spectral coefficients with that of the original signal. To achieve this, average spectral energies are calculated on spectral coefficients from one or more consecutive AAC scale factor bands. Computing average energies using boundaries defined by scale factor bands is motivated by the already existing careful tuning of those boundaries to fractions of the critical bands, which are characteristic to human hearing. The average energies are converted into a dB scale representation using a formula similar to the one for the AAC scale factors, and then uniformly quantized. In IGF, different quantization accuracy may be optionally used depending on the requested total bitrate. The average energies constitute a significant part of the information generated by IGF, so its efficient representation is of high importance for the overall performance of IGF.

Accordingly, in IGF, scale factor energies describe the spectral envelope. The Scale Factor Energies (SFE) represent spectral values describing the spectral envelope. It is possible to exploit special properties of the SFE when decoding same. In particular, it has been realized that in contrast to [2] and [3], SFEs represent average values of MDCT spectral lines and accordingly their values are much more "smooth" and linearly correlated to the average magnitude of the corresponding complex spectral lines. Exploiting this circumstance, the following embodiments use a combination of spectral envelope sample value prediction on the one hand and context-based entropy coding of the prediction residual using contexts depending on a measure of a deviation of a pair of neighboring already coded/decoded sample values of the spectral envelope on the other hand. The usage of this combination is particularly adapted to this sort of data to be coded, i.e. the spectral envelope.

Figure 1:
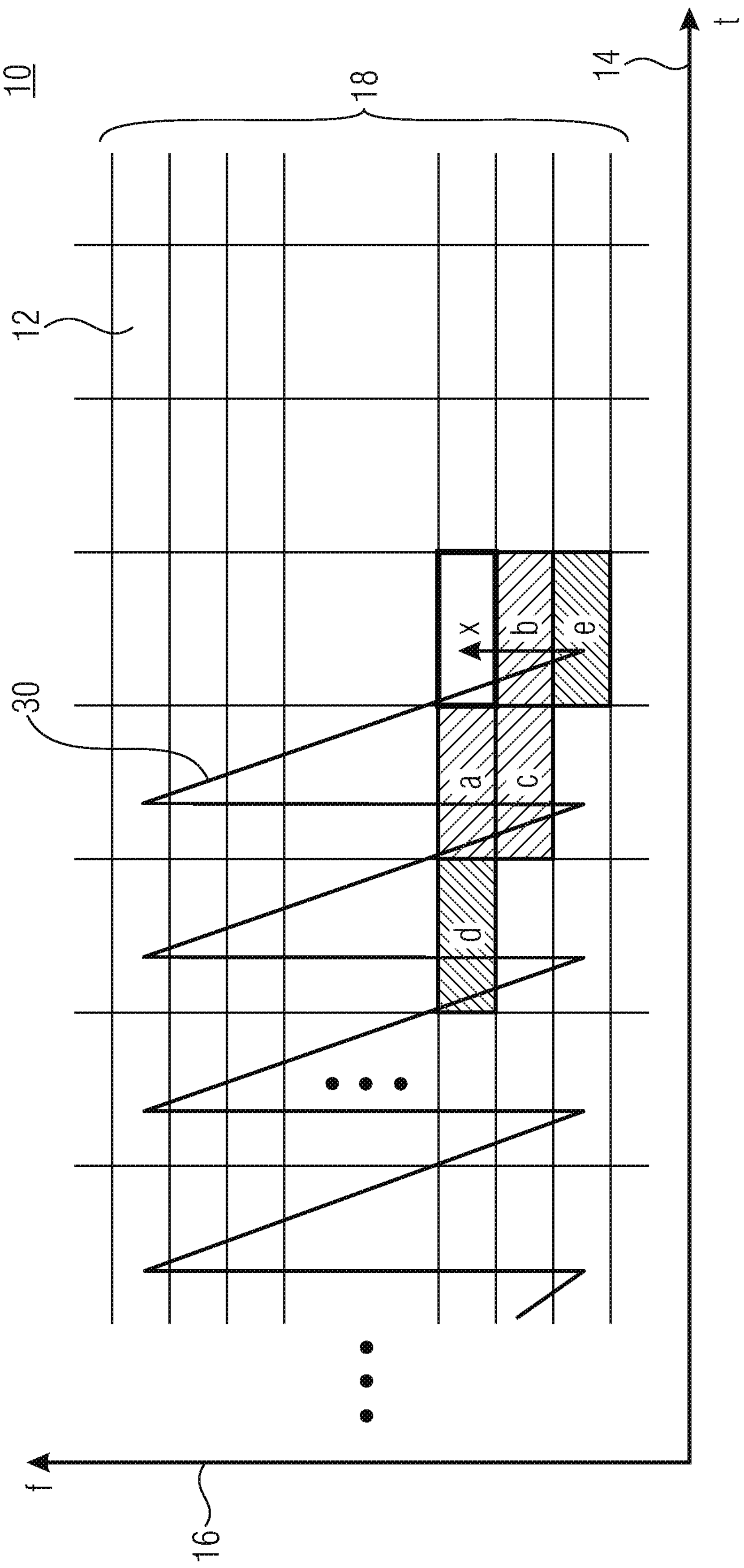
FIG. 1 shows a schematic of a spectral envelope and illustrates its composition out of sample values and a possible decoding order defined thereamong as well as a possible spectrotemporal neighborhood for a currently coded/decoded sample value of the spectral envelope.

In order to ease the understanding of the embodiments outlined further below, FIG. 1 shows a spectral envelope 10 and its composition out of sample values 12 which sample the audio signal's spectral envelope 10 at a certain spectrotemporal resolution. In FIG. 1, the sample values 12 are exemplarily arranged along time axis 14 and spectral axis 16.

Each sample value 12 describes or defines the height of the spectral envelope 10 within a corresponding spatiotemporal tile covering, for example, a certain rectangle of the spatiotemporal domain of a spectrogram of an audio signal. The sample values are, thus, integrative values having been obtained by integrating a spectrogram over its associated spectrotemporal tile. The sample values 12 may measure the height or strength of the spectral envelope 10 in terms of energy or some other physical measure, and may be defined in the non-logarithmic or linear domain, or in the logarithmic domain, wherein the logarithmic domain may provide additional advantages due to its characteristic of additionally smoothening the sample values along axes 14 and 16, respectively.

It should be noted that as far as the following description is concerned, it is assumed for illustration purposes only that the sample values 12 are regularly arranged spectrally and temporally, i.e. that the corresponding spatiotemporal tiles corresponding to the sample values 12 regularly cover a frequency band 18 out of a spectrogram of an audio signal, but such regularity is not mandatory. Rather, an irregular sampling of the spectral envelope 10 by the sample values 12 may also be used, each sample value 12 representing the mean average of the height of the spectral envelope 10 within its corresponding spatiotemporal tile. The neighborhood definitions outlined further below may nevertheless be transferred to such alternative embodiments of an irregular sampling of the spectral envelope 10. A brief statement on such a possibility is presented below.

Before, however, it is noted that the above mentioned spectral envelope may be subject to encoding and decoding for transmission from encoder to decoder for various reasons. For example, the spectral envelope may be used for the sake of scalability purposes so as to extend a core encoding of a low frequency band of an audio signal, namely extending the low frequency band towards higher frequencies, namely into a high frequency band which the spectral envelope relates to. In that case, the context-based entropy decoders/encoders described below could be part of an SBR decoder/encoder, for example. Alternatively, same could be part of audio encoders/decoders using IGF as already mentioned above. In IGF, a high frequency portion of an audio signal spectrogram is additionally described using the spectral values describing the high frequency portions spectral envelope of the spectrogram so as to be able to fill zero-quantized areas of the spectrogram within the high frequency portion using the spectral envelope. Details in this regard are described further below.

Figure 2:
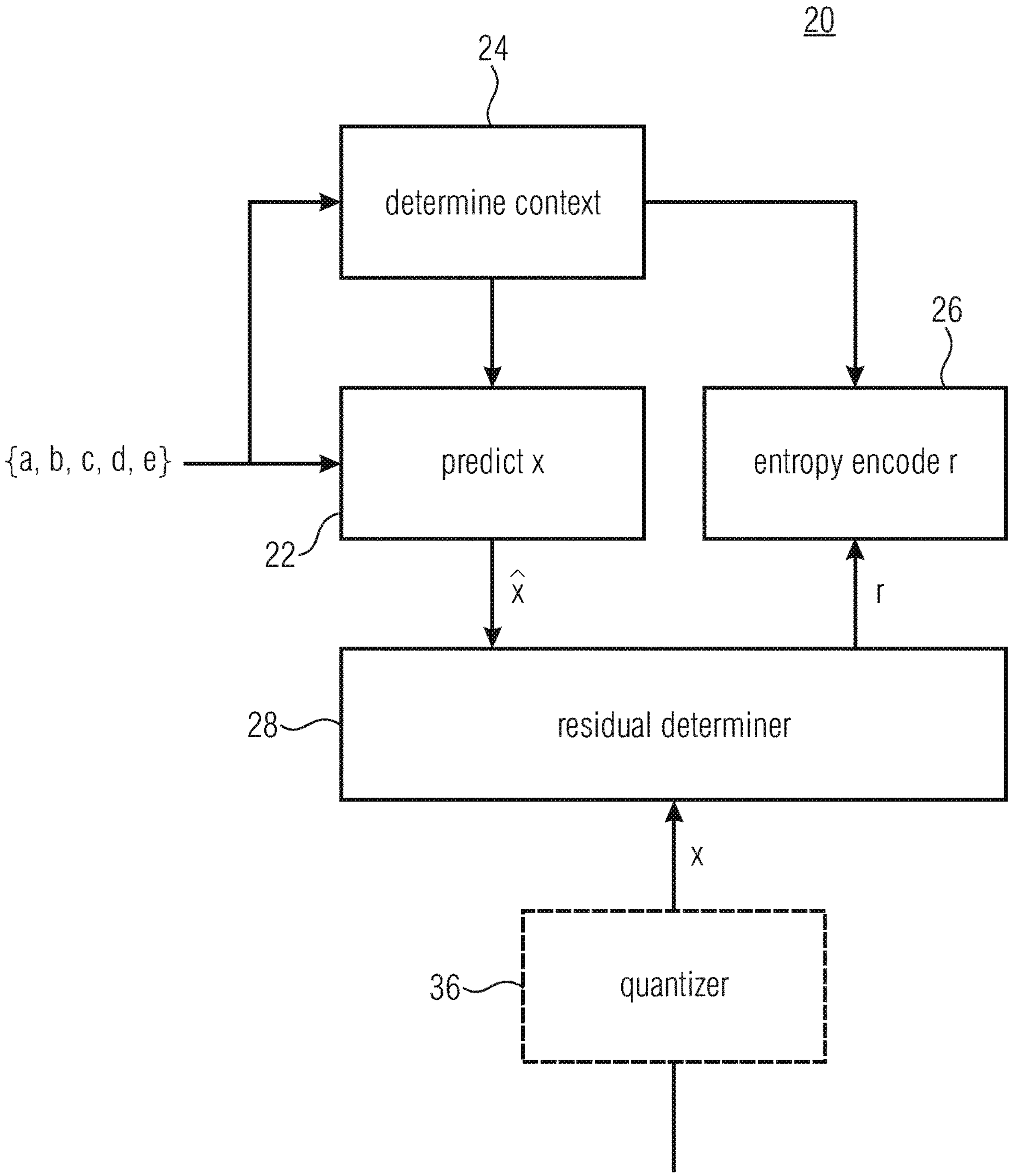
FIG. 2 shows a block diagram of a context-based entropy encoder for encoding sample values of a spectral envelope in accordance with an embodiment.

FIG. 2 shows the context-based entropy encoder for encoding sample values 12 of a spectral envelope 10 of an audio signal in accordance with an embodiment of the present application.

The context-based entropy encoder of FIG. 2 is generally indicated using reference sign 20 and comprises a predictor 22, a context determiner 24, an entropy encoder 26 and a residual determiner 28. The context determiner 24 and the predictor 22 have inputs at which same have access to the sample values 12 of the spectral envelope (FIG. 1). The entropy encoder 26 has a control input connected to an output of context determiner 24, and a data input connected to an output of residual determiner 28. The residual determiner 28 has two inputs, one of which is connected to an output of predictor 22, and the other one of which provides the residual determiner 28 with access to the sample values 12 of the spectral envelope 10. In particular, residual determiner 28 receives the sample value x currently to be coded at its input, while context determiner 24 and predictor 22 receive at their inputs sample values 12 already having been coded and residing within a spectrotemporal neighborhood of the current sample value x.

The predictor 22 is configured to spectrotemporally predict the current sample value x of the spectral envelope 10 to obtain an estimated value g. As will be illustrated in connection with a more detailed embodiment outlined below, predictor 22 may use linear prediction. In particular, in performing the spectrotemporal prediction, predictor 22 inspects already coded sample values in a spectrotemporal neighborhood of current sample value x. See, for example, FIG. 1. The current sample value x is illustrated using a bold continuously drawn outline. Using hashing, sample values in the spectrotemporal neighborhood of current sample x are shown which, in accordance with an embodiment, form a basis for the spectrotemporal prediction of predictor 22. "a", for example, denotes the sample value 12 immediately neighboring current sample x, which is co-located to current sample x spectrally, but precedes current sample x temporally. Likewise, neighboring sample value "b" denotes the sample value immediately neighboring current sample x, which is co-located to current sample value x temporally, but relates to lower frequencies when compared to current sample value x, and sample value "c" in the spectrotemporal neighborhood of current sample value x is the nearest neighbor sample value of current sample value x, which precedes the latter temporally, and relates to lower frequencies. The spectrotemporal neighborhood may even encompass sample values representing next but one neighbors of current sample x. For example, sample value "d" is separated from current sample value x by sample value "a", i.e. it is co-located to current sample value x temporally and precedes current value x with merely sample value "a" being positioned therebetween. Likewise, sample value "e" neighbors sample value x while being co-located to current sample value x temporally, and neighboring sample value x along the spectral axis 16 with merely neighbor sample "b" being positioned therebetween.

As already outlined above, although the sample values 12 are assumed to be regularly arranged along time and spectral axes 14 and 16, this regularity is not mandatory, and the neighborhood definition and identification of neighboring sample values may be extended to such an irregular case. For example, neighbor sample value "a" may be defined as the one neighboring the upper left corner of the current sample's spectrotemporal tile along the temporal axis with preceding the upper left corner temporally. Similar definitions may be used to define other neighbors as well, such as neighbors b to e.

As will be outlined in more detail below, predictor 22 may, depending on the spectrotemporal position of current sample value x, use a different subset of all sample values within the spectrotemporal neighborhood, i.e. a subset of {a, b, c, d, e}. Which subset is actually used may, for example, depend on the availability of the neighboring sample values within the spectrotemporal neighborhood defined by set {a, b, c, d, e}. The neighboring sample values a, d, and c may, for example be unavailable due to current sample value x immediately succeeding a random access point, i.e. a point in time enabling decoders to start decoding so that dependencies on previous portions of the spectral envelope 10 are forbidden/prohibited. Alternatively, neighboring sample values b, c, and e may be unavailable due to the current sample value x representing the low frequency edge of interval 18 so that the respective neighboring sample value's position falls outside interval 18. In any case, predictor 22 may spectrotemporally predict the current sample value x by linearly combining already coded sample values within the spectrotemporal neighborhood.

The task of the context determiner 24 is to select one of the several supported contexts for entropy encoding the prediction residual, i.e. $r=x-\hat{x}$. To this end, the context determiner 24 determines the context for current sample value x dependent on a measure for a deviation between a pair of already coded sample values among a to e in the spectrotemporal neighborhood. In the specific embodiments outlined further below, the difference of a pair of sample values within the spectrotemporal neighborhood is used as a measure for a deviation therebetween, such as for example a-c, b-c, b-e, a-d or the like, but alternatively other deviation measures may be used such as, for example, a quotient (i.e. a/c, b/c, a/d), the difference to the power of a value unequal to one, such as an uneven number n unequal to one (i.e. (a-c)n, (b-c)n, (a-d)n), or some other type of deviation measure such as, for example, $a^n$-$c^n$, $b^n$-$d^n$, $a^n$-$d^n$ or $(a/e)^n$, $(b/e)^n$, $(a/d)^n$ with n #1. Here, n could also be any value greater than 1, for example.

As will be shown in more detail below, the context determiner 24 may be configured to determine the context for the current sample value x dependent on a first measure for a deviation between a first pair of already coded sample values in the spectrotemporal neighborhood and a second measure for a deviation between a second pair of already coded sample values within the spectrotemporal neighborhood, with the first pair neighboring each other spectrally, and the second pair neighboring each other temporally. For example, difference values b-c and a-c may be used where a and c neighbor each other spectrally, and b and c neighbor each other temporally. The same set of neighboring sample values, namely {a, c, b}, may be used by predictor 22 to obtain the estimated value g, namely, for example, by a linear combination of the same. A different set of neighboring sample values may be used for context determination and/or prediction in cases of some unavailability of any of sample values a, c and/or b. The factors of the linear combination may, as set out further below, be set so that the factors are the same for different contexts, in case of the bitrate at which the audio signal is coded being greater than a predetermined threshold, and the factors are set individually for the different contexts, in case of the bitrate being lower than a predetermined threshold.

As an intermediate note, it should be mentioned that the definition of the spectrotemporal neighborhood may be adapted to the coding/decoding order along which context-based entropy encoder 20 sequentially encodes the sample values 12. As shown in FIG. 1, for example, the context-based entropy encoder may be configured to sequentially encode the sample values 12 using a decoding order 30 which traverses the sample values 12 time instant by time instant with, in each time instant, leading from lowest to highest frequency. In the following, the "time instants" are denoted as "frames", but the time instants could alternatively be called time slots, time units or the like. In any case, in using such spectral traversal before temporal feed forward, the definition of the spectrotemporal neighborhood to extend into preceding time and towards lower frequencies provides for the highest feasible probability that the corresponding sample values have already been coded/decoded and are available. In the present case, the values within the neighborhood are already coded/decoded, provided they are present, but this may be different for other neighborhood and decoding order pairs. Naturally, the decoder uses the same decoding order 30.

The sample values 12 may, as already denoted above, represent the spectral envelope in a logarithmic domain. In particular, the spectral values 12 may have already been quantized to integer values using a logarithmic quantization function. Accordingly, due to quantization, the deviation measures determined by context determiner 24 may already be integer numbers inherently. This is for example the case when using the difference as the deviation measure. Irrespective of the inherent integer number nature of the deviation measure determined by context determiner 24, context determiner 24 may subject the deviation measure to quantization and determine the context using the quantized measure. In particular, as will be outlined below, the quantization function used by context determiner 24 may be constant for values of the deviation measure outside a predetermined interval, the predetermined interval including zero, for example.

Figure 3:
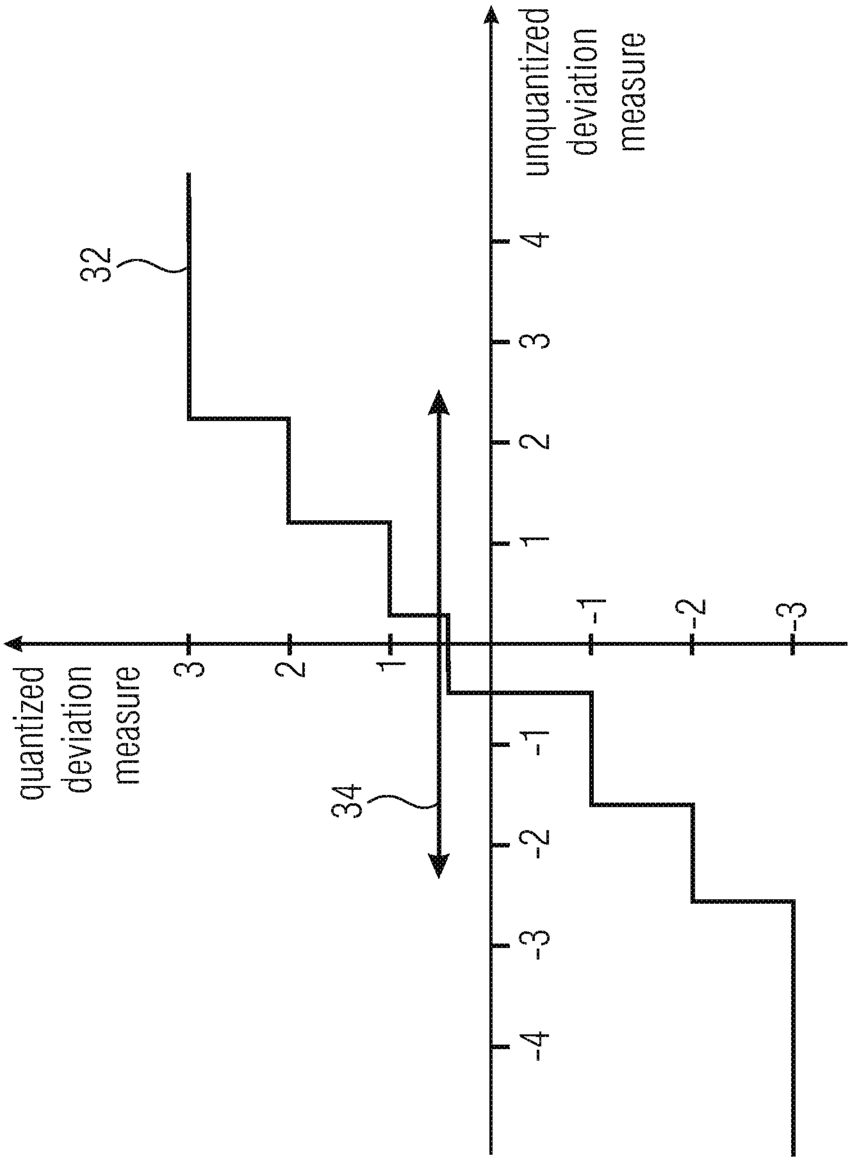
FIG. 3 shows a schematic diagram illustrating a quantization function which may be used in quantizing the derivation measure.

FIG. 3 exemplarily shows such quantization function 32 mapping unquantized deviation measures to quantized deviation measures where, in this example, the just mentioned predetermined interval 34 extends from −2.5 to 2.5, wherein unquantized deviation measure values above that interval are constantly mapped to quantized deviation measure value 3, and unquantized deviation measure values below that interval 34 are constantly mapped to quantized deviation measure value −3. Accordingly, merely seven contexts are distinguished and have to be supported by the context-based entropy encoder. In implementation examples outlined below, the length of interval 34 is 5 as just-exemplified, with the cardinality of the set of possible values of the spectral envelope's sample values being $2^n$ (e.g. =128), i.e. greater than 16 times the interval length. In case of escape coding being used as illustrated later, the range of possible values of the spectral envelope's sample values may by defined to be [0; $2^n$[ with n being an integer selected such that $2^{n+1}$ is below the cardinality of codeable possible values of the prediction residual values which is, in accordance with a specific implementation example described below, 311.

The entropy encoder 26 uses the context determined by context determiner 24 to efficiently entropy encode the prediction residual r which, in turn, is determined by residual determiner 28 on the basis of the actual current sample value x and the estimated value g such as, for example, by means of subtraction. Advantageously, arithmetic coding is used. The contexts may have associated therewith constant probability distributions. For each context, the probability distribution associated therewith assigns a certain probability value to each possible symbol out of a symbol alphabet of entropy encoder 26. For example, the symbol alphabet of entropy encoder 26 coincides with, or covers, the range of possible values of prediction residual r. In alternative embodiments, which are outlined in more detail below, a certain escape coding mechanism may be used so as to guarantee that the value r to be entropy encoded by entropy encoder 26 is within the symbol alphabet of entropy encoder 26. When using arithmetic coding, the entropy encoder 26 uses the probability distribution of the determined context determined by context determiner 24, so as to subdivide a current probability interval which represents the internal state of entropy encoder 26 into one subinterval per alphabet value, with selecting one of the subintervals depending on the actual value of r, and outputting an arithmetically coded bitstream informing the decoding side on updates of probability interval offset and width by use of, for example, a renormalization process. Alternatively, however, entropy encoder 26 may use, for each context, an individual variable length coding table translating the probability distribution of the respective context into a corresponding mapping of possible values of r onto codes of a length corresponding to the respective frequency of the respective possible value r. Other entropy codecs may be used as well.

For the sake of completeness, FIG. 2 shows that a quantizer 36 may be connected in front of the input of residual determiner 28, at which the current sample value x is inbound so as to obtain the current sample value x such as, as already outlined above, by use of a logarithmic quantization function, for example, applied to an unquantized sample value x.

Figure 4:
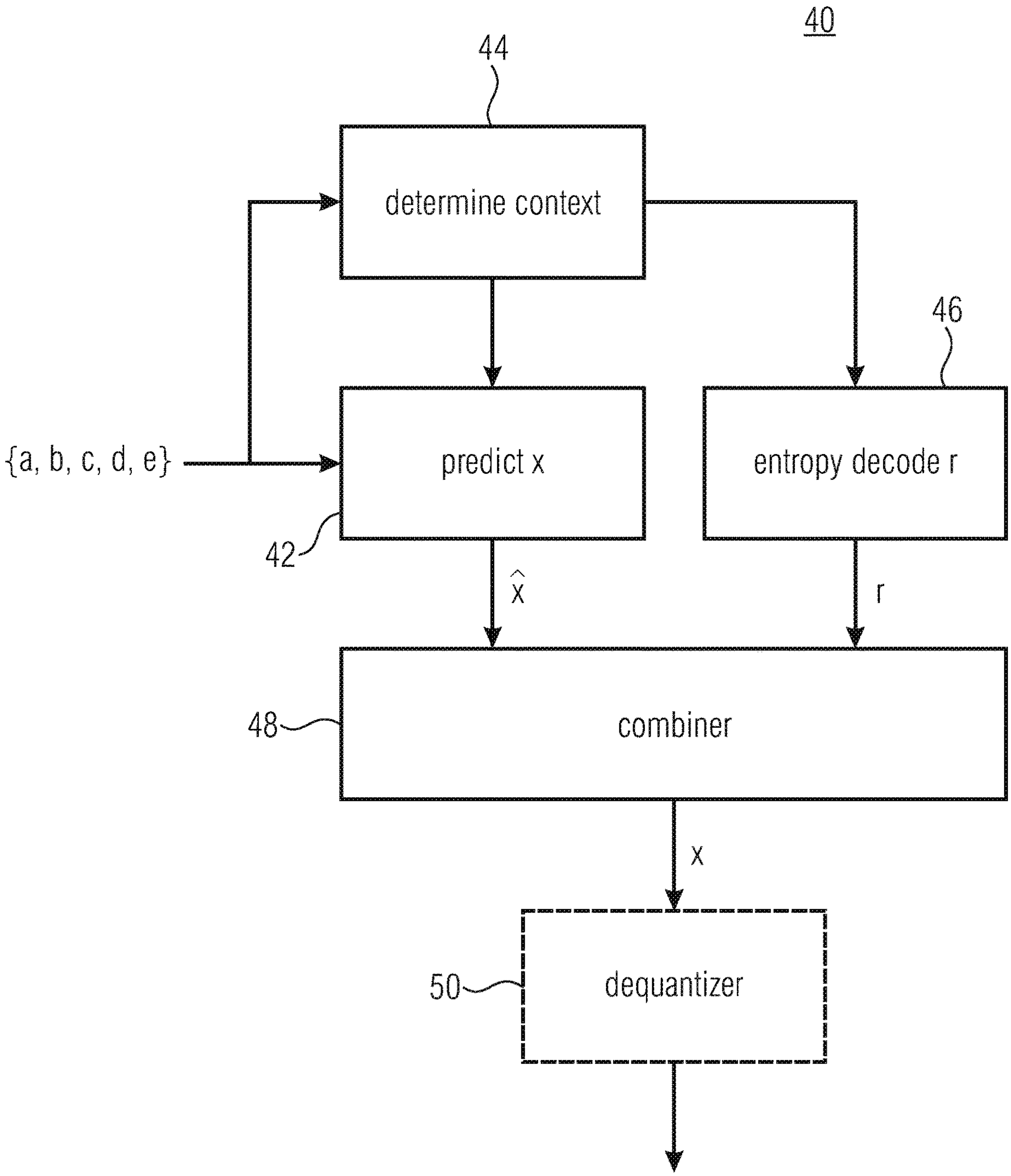
FIG. 4 shows a block diagram of a context-based entropy decoder fitting to the encoder of FIG. 2.

FIG. 4 shows a context-based entropy decoder in accordance with an embodiment, which fits to the context-based entropy encoder of FIG. 2.

The context-based entropy decoder of FIG. 4 is indicated using reference sign 40 and is construed similarly to the encoder of FIG. 2. Accordingly, context-based entropy decoder 40 comprises a predictor 42, a context-determiner 44, an entropy decoder 46, and a combiner 48. Context determiner 44 and predictor 42 operate like predictor 22 and context determiner 24 of encoder 20 of FIG. 2. That is, predictor 42 spectrotemporally predicts the current sample value x, i.e. the one currently to be decoded, to obtain the estimated value $\hat{x}$ and outputs same to combiner 48, and context determiner 44 determines the context for entropy decoding the prediction residual r of current sample value x depending on the deviation measure between a pair of already decoded sample values within the spectrotemporal neighborhood of sample value x, informing the entropy decoder 46 of the context determined via a control input of the latter. Accordingly, both context determiner 44 and predictor 42 have access to the sample values in the spectrotemporal neighborhood. Combiner 48 has two inputs connected to outputs of predictor 42 and entropy decoder 46, respectively, and an output for outputting the current sample value. In particular, entropy coder 46 entropy decodes the residual value r for current sample values x using the context determined by context determiner 44, and combiner 48 combines the estimated value $\hat{x}$ and the corresponding residual value r to obtain the current sample value x, such as for example by addition. For the sake of completeness only, FIG. 4 shows that a dequantizer 50 may succeed the output of combiner 48 so as to dequantize the sample value output by combiner 48, such as for example by subjecting the same to a conversion from logarithmic domain to linear domain using, for example, an exponential function.

The entropy decoder 46 reverses the entropy encoding performed by entropy encoder 26. That is, entropy decoder also manages a number of contexts and uses, for a current sample value x, a context selected by context determiner 44, with each context having a corresponding probability distribution associated therewith which assigns to each possible value of r a certain probability which is the same as the one chosen by context determiner 24 for entropy encoder 26.

When using arithmetic coding, entropy decoder 46 reverses, for example, the interval subdivision sequence of entropy encoder 26. The internal state of entropy decoder 46 is, for example, defined by the probability interval width of the current interval and an offset value pointing, within the current probability interval, to the subinterval out of the same to which the actual value of r of the current sample value x corresponds. The entropy decoder 46 updates the probability interval and offset value using the inbound arithmetically encoded bitstream output by entropy encoder 26 such as by way of a renormalization process and obtains the actual value of r by inspecting the offset value and identifying the subinterval which same falls into.

Figure 5:
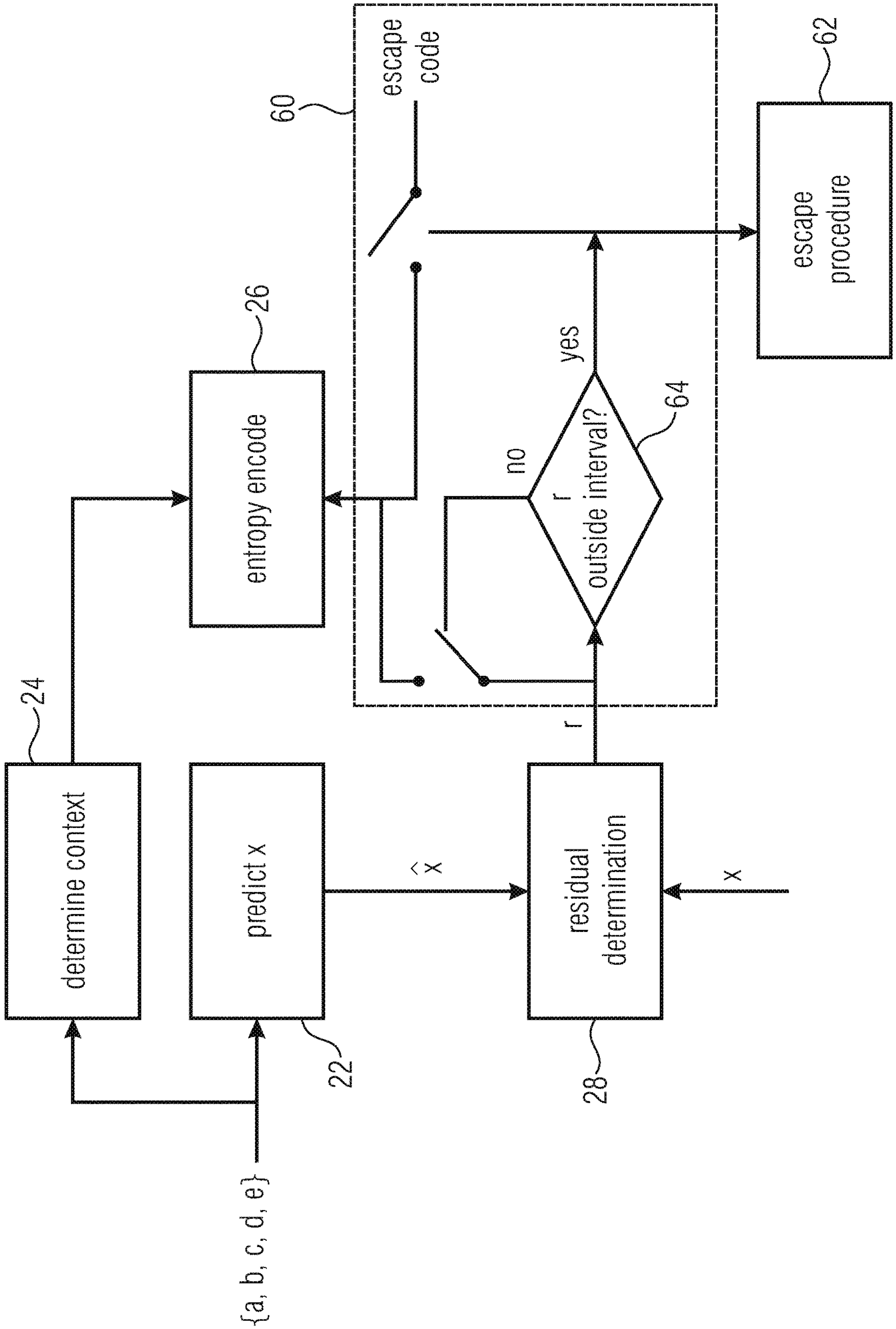
FIG. 5 shows a block diagram of a context-based entropy encoder for encoding sample values of a spectral envelope in accordance with a further embodiment.

As already mentioned above, it may be advantageous to restrict the entropy coding of the residual values onto some small subinterval of possible values of prediction residuals r. FIG. 5 shows a modification of the context-based entropy encoder of FIG. 2 to realize this. In addition to the elements shown in FIG. 2, the context-entropy encoder of FIG. 5 comprises a control connected between residual determiner 28 and entropy encoder 26, namely control 60, as well as an escape coding handler 62 controlled via control 60.

Figure 6:
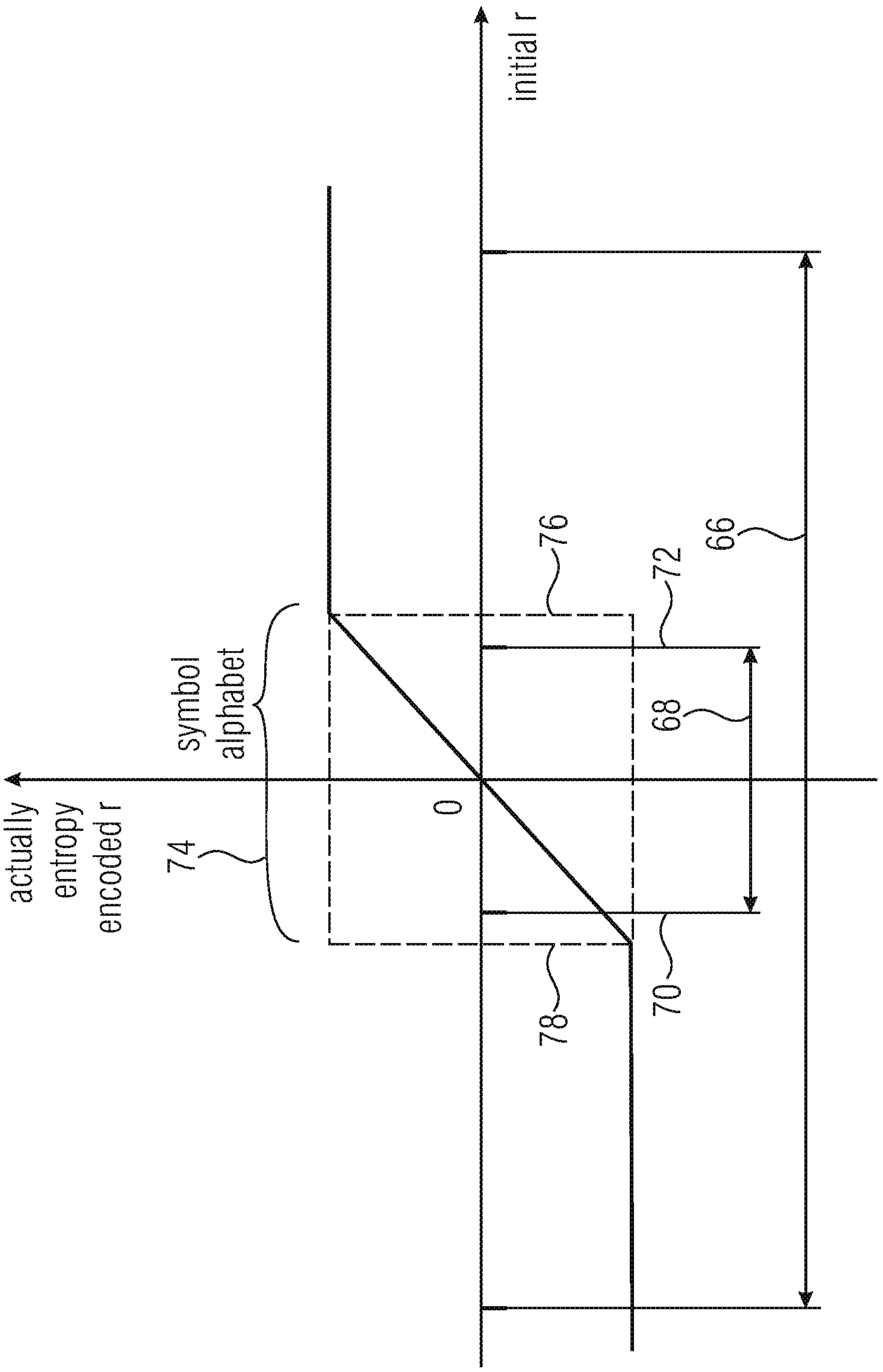
FIG. 6 shows a schematic diagram illustrating placement of the interval of entropy coded possible values of the prediction residual relative to the overall interval of possible values of the prediction residuals in accordance with an embodiment using escape coding.

The functionality of control 60 is illustrated in FIG. 5 in a cursory manner. As illustrated in FIG. 5, control 60 inspects the initially determined residual value r determined by residual determiner 28 on the basis of a comparison of the actual sample value x and its estimated value g. In particular, control 60 inspects whether r is within or outside a predetermined value interval as illustrated in FIG. 5 at 64. See, for example, FIG. 6. FIG. 6 shows along the x axis possible values of the initial prediction residual r, while the y axis shows the actually entropy encoded r. Further, FIG. 6 shows the range of possible values of the initial prediction residual r, namely 66, and the just mentioned predetermined interval 68 involved in the check 64. Imagine, for example, that the sample values 12 are integer values between 0 and $2^{n-1}$, both inclusively. Then, the range 66 of possible values for the prediction residual r may extend from $-(2^n-1)$ to $2^n-1$, both inclusively, and the absolute values of the interval bounds 70 and 72 of interval 68 may be smaller than or equal to $2^{n-2}$, that is the interval bounds' absolute values may be smaller than ⅛ of the cardinality of the set of possible values within range 66. In one of the implementation examples set out below in connection with xHE-AAC, the interval 68 is from −12 to +12 inclusive, the interval bounds 70 and 72 are −13 and +13, and escape coding extends the interval 68 by coding a VLC coded absolute value namely extending interval 68 to −/+(13+15) using 4 bits and to −/+(13+15+127) using another 7 bits, if previous 4 bits were 15. So the prediction residual can be coded in a range from −4155, inclusive, in order to sufficiently cover the range 66 of possible values for the prediction residual which, in turn, extends from −127 to 127. As can be seen, the cardinality of [127; 127] is 255, and 13, i.e. the absolute values of the internal bounds 70 and 72, is smaller than 32≈255/8. When comparing the length of interval 68 with the cardinality of possible values codeable using escape coding, i.e. [−155; 155], then one discovers that absolute values of the internal bounds 70 and 72 may advantageously be chosen to be smaller than ⅛ or even 1/16 of said cardinality (here 311).

In case of the initial prediction residual r residing within interval 68, control 60 causes entropy encoder 26 to entropy encode this initial prediction residual r directly. No special measure is to be taken. However, if r as provided by residual determiner 28 is outside interval 68, an escape coding procedure is initiated by control 60. In particular, the immediate neighbor values immediately neighboring the interval bounds 70 and 72 of interval 68 may, in accordance with one embodiment, belong to the symbol alphabet of entropy encoder 26 and serve as escape codes themselves. That is, the symbol alphabet of the entropy encoder 26 would encompass all values of interval 68 plus the immediately neighboring values below and above that interval 68 as indicated with curly bracket 74 and control 60 would simply reduce the value to be entropy encoded down to the highest alphabet value 76 immediately neighboring the upper bound 72 of interval 68 in the case of residual value r being greater than upper bound 72 of interval 68, and would forward the lowest alphabet value 78 to entropy encoder 26, immediately neighboring lower bound 70 of interval 68, in the case of the initial prediction residual r being smaller than the lower bound 70 of interval 68.

By use of the embodiment just outlined, the entropy encoded value r corresponds to, i.e. equals, the actual prediction residual in case of same being within interval 68. If, however, the entropy encoded value r equals value 76, then it is clear that the actual prediction residual r of current sample value x equals 76 or some value above the latter, and if the entropy encoded residual value r equals value 78, then the actual prediction residual r equals this value 78 or some value below the same. That is, there are actually two escape codes 76 and 78 in that case. In case of the initial value r lying outside interval 68, control 60 triggers escape coding handler 62 to insert within the data stream, into which the entropy encoder 26 outputs its entropy coded data stream, a coding which enables the decoder to recover the actual prediction residual, either in a self-contained manner independent from the entropy encoded value r being equal to escape code 76 or 78, or dependent thereon. For example, escape coding handler 62 may write into the data stream the actual prediction residual r directly using a binary representation of sufficient bit length, such as of length $2^{n+1}$, including the sign of the actual prediction residual r, or merely the absolute value of the actual prediction residual r using a binary representation of bit length $2^n$ using escape code 76 for signaling the plus sign, and escape code 78 for signaling the minus sign. Alternatively, merely the absolute value of the difference between the initial prediction residual value r and the value of escape code 76 is coded in case of the initial prediction residual exceeding upper bound 72, and the absolute value of the difference between the initial prediction residual r and the value of the escape code 78 in case of the initial prediction residual residing below lower bound 70. This is, in accordance with one implementation example, done using conditionally coding: Firstly, $\min(|x-\hat{x}|-13; 15)$ is coded in the escape coding case, using four bits, and if $\min(|x-\hat{x}|-13; 15)$ equals 15, then $|x-\hat{x}|13\text{-}15$ is coded, using another seven bits.

Obviously, the escape coding is less complex than the coding of the usual prediction residuals lying within interval 68. No context adaptivity is, for example, used. Rather, the coding of the value coded in the escape case may be performed by simply writing a binary representation for a value such as |r| or even x, directly. However, the interval 68 may be selected such that the escape procedure occurs statistically seldomly and merely represents "outliers" in the statistics of sample values x.

Figure 7:
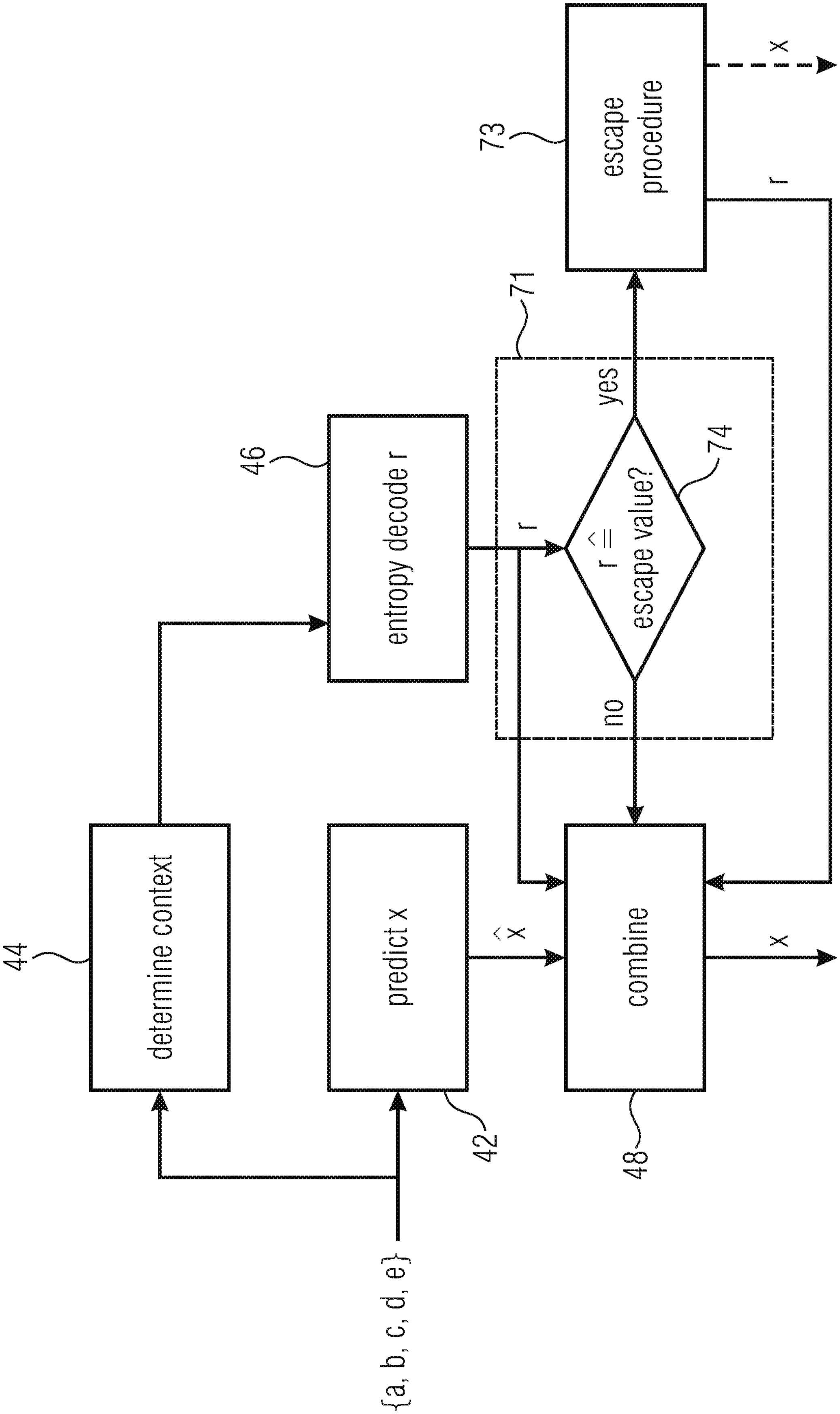
FIG. 7 shows a block diagram of a context-based entropy decoder fitting to the encoder of FIG. 5.

FIG. 7 shows a modification of the context-based entropy decoder of FIG. 4, corresponding to, or fitting to, the entropy encoder of FIG. 5. Similar to the entropy encoder of FIG. 5, the context-based entropy decoder of FIG. 7 differs from the one shown in FIG. 4 in that a control 71 is connected between entropy decoder 46 on the one hand, and combiner 48 on the other hand, wherein the entropy decoder of FIG. 7 additionally comprises an escape code handler 73. Similar to FIG. 5, control 71 performs a check 74 whether the entropy decoded value r output by entropy decoder 46 lies within interval 68 or corresponds to some escape code. If the latter circumstance applies, escape code handler 73 is triggered by control 71 so as to extract from the data stream also carrying the entropy encoded data stream entropy decoded by entropy decoder 46, the aforementioned code inserted by escape code handler 62 such as, for example, a binary representation of sufficient bit length which might indicate the actual prediction residual r in a self-contained manner independent from the escape code indicated by the entropy decoded value r, or in a manner dependent on the actual escape code which the entropy decoded value r assumes as already explained in connection with FIG. 6. For example, escape code handler 73 reads a binary representation of a value from the data stream, adds same to the absolute value of the escape code, i.e. the absolute value of the upper or lower bound, respectively, and uses as a sign of the value read the sign of the respective bound, i.e. the plus sign for the upper bound, the minus sign for the lower bound. Conditional coding could be used. That is, if the entropy decoded value r output by entropy decoder 46 lies outside interval 68, escape code handler 73 could firstly read, for example, a p-bit absolute value from the data stream and check as to whether same is $2^p-1$. If not, the entropy decoded value r is updated by adding the p-bit absolute value to the entropy decoded value r if the escape code was the upper bound 72, and subtracting the p-bit absolute value from the entropy decoded value r if the escape code was the lower bound 70. If, however, the p-bit absolute value is $2^p-1$, then another q-bit absolute value is read from the bitstream and the entropy decoded value r is updated by adding the q-bit absolute value plus $2^p-1$ to the entropy decoded value r if the escape code was the upper bound 72, and subtracting the p-bit absolute value plus $2^p-1$ from the entropy decoded value r if the escape code was the lower bound 70.

However, FIG. 7 shows also another alternative. According to this alternative, the escape code procedure realized by escape code handlers 62 and 72 codes the complete sample value x directly so that in escape code cases, the estimated value $\hat{x}$ is superfluous. For example, a $2^n$ bit representation may suffice in that case and indicate the value of x.

As a precautionary measure only, it is noted that another way of realizing escape coding would be feasible as well with these alternative embodiments by not entropy decoding anything for spectral values, the prediction residual of which exceeds, or lies outside, interval 68. For example, for each syntax element a flag could be transmitted indicating whether same is encoded using entropy encoding, or whether escape coding is used. In that case, for each sample value a flag would indicate the chosen way of coding.

In the following, a concrete example for implementing the above embodiments is described. In particular, the explicit example set out below exemplifies how to deal with the aforementioned unavailability of certain previously coded/decoded sample values in the spectrotemporal neighborhood. Further, specific examples are presented for setting the possible value range 66, the interval 68, the quantization function 32, range 34 and so forth. Later on it will be described that the concrete example may be used in connection with IGF. However, it is noted that the description set out below may easily be transferred to other cases where the temporal grid at which the spectral envelope's sample values are arranged, is, for example, defined by other time units than frames such as groups of QMF slots, and the spectral resolution is likewise defined by a sub-grouping of subbands into spectrotemporal tiles.

Let us denote with t (time) the frame number across time, and f (frequency) the position of the respective sample value of the spectral envelope across scale factors (or scale factor groups). The sample values are called SFE value in the following. We want to encode the value of x, using information already available from previously decoded frames at positions (t−1), (t−2), . . . , and from the current frame at position (t) at frequencies (f−1), (f−2), . . . . The situation is again depicted in FIG. 8.

Figure 8:
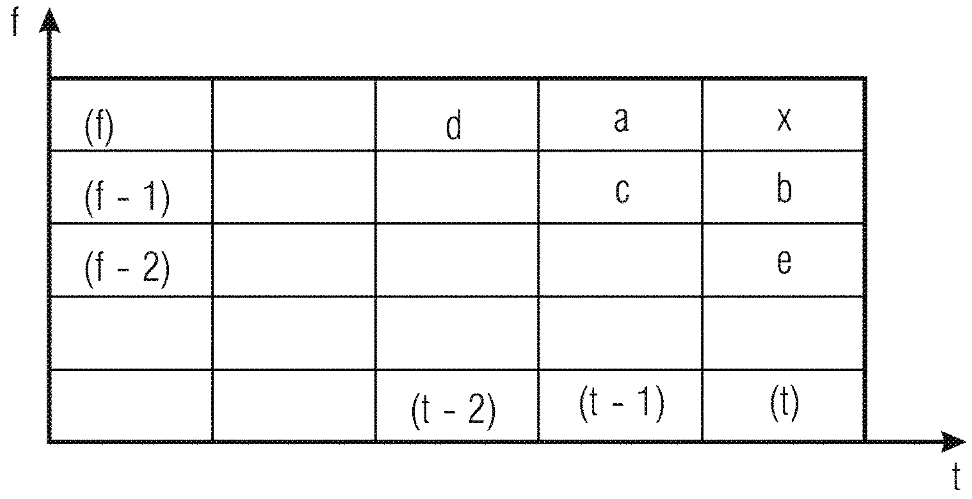
FIG. 8 shows a possible definition of a spectrotemporal neighborhood using a certain notation.

For an independent frame, we set t=0. An independent frame is a frame which qualifies itself as a random access point for a decoding entity. It thus represents a time instant where random access into decoding is feasible at the decoding side. As far as the spectral axis 16 is concerned, the first SFE 12 associated with the lowest frequency shall have f=0. In FIG. 8, the neighbors in time and frequency (available at both the encoder and decoder) which are used for computing the context are, as it was the case in FIG. 1, a, b, c, d, and e.

We have several cases depending on whether t=0 or f=0. In each case and in each context, we may compute an adaptive estimate $\hat{x}$ of the value x, based on the neighbors, as follows:

| | |
|---|---|
| $t = 0$ | spectrotemporal prediction $\hat{x} = 0$, |
| $f = 0$ | context-adaptively encode $r = x - \hat{x}$ using 7 bit raw binary; |
| $t = 0$ | spectrotemporal prediction $\hat{x} = b$, |
| $f = 1$ | context-adaptively encode $r = x - \hat{x}$ using context se01; |
| $t = 0$ | spectrotemporal prediction $\hat{x} = b$, |
| $f \geq 2$ | context-adaptively encode $r = x - \hat{x}$ using context se02 [Q(b − e)]; |
| $t = 1$ | spectrotemporal prediction $\hat{x} = a$, |
| $f = 0$ | context-adaptively encode $r = x - \hat{x}$ using context se10; |
| $t \geq 2$ | spectrotemporal prediction $\hat{x} = a$, |
| $f = 0$ | context-adaptively encode $r = x - \hat{x}$ using context se20[Q(a − d)]; |
| $t \geq 1$ | spectrotemporal prediction |
| $f \geq 1$ | $\hat{x} = \mathrm{rINT}(\alpha_{[Q(b-c)][Q(a-c)]}a + \beta_{[Q(b-c)][Q(a-c)]}b + \gamma_{[Q(b-c)][Q(a-c]}c + \delta_{[Q(b-c)][Q(a-c)]})$, context-adaptively encode $x - \hat{x}$ using context se11 [Q(b − c)][Q(a − c)]. |

The values b-e and a-c represent, as already denoted above, deviation measures. They represent the expected amount of noisiness of variability across frequency near the value to be decoded/coded, namely x. The values b-c and a-d represent the expected amount of noisiness of variability across time near x. To significantly reduce the total number of contexts, they may be non-linearly quantized before they are used to select the context such as, for example, as set out with respect to FIG. 3. The context indicates the confidence of the estimated value R, or equivalently the peakiness of the coding distribution. For example, the quantization function can be as illustrated in FIG. 3. It may be defined as Q(x)=x, for |x|≤3 and Q(x)=3 sign(x), for |x|>3. This quantization function maps all the integer values to the seven values {−3, −2, −1, 0, 1, 2, 3}. Please note the following. In writing Q(x)=x it has already been exploited that the difference of two integers is an integer itself. The formula could be written as Q(x)=rInt(x) in order to match the more general description brought forward above, and the function in FIG. 3, respectively. However, if only used for integer inputs for the deviation measure, Q(x)=x is functionally equivalent with Q(x)=rInt(x), for integer x, with |x|≤3.

The terms se02[·], se20[·], and se11[·][·] in the above table are context vectors/matrices. That is, each of the entries of these vectors/matrices are/represent a context index indexing one of the available contexts. Each of these three vectors/matrices may index a context out of a disjoint sets of contexts. That is, different sets of contexts may be chosen by the context determiner outlined above depending on the availability condition. The above table exemplarily distinguishes between six different availability conditions. The context corresponding to se01 and se10 may correspond to contexts different from any context of the context groups indexed by se02, se20 and se11, too. The estimated value of x is computed as $\hat{x}=\mathrm{rINT}(\alpha a+\beta b+\gamma c+\delta)$. For higher bitrates, $\alpha=1$, $\beta=-1$, $\gamma=1$, and $\delta=0$ may be used, and for lower bitrates a separate set of coefficients may be used for each context, based on information from a training data set.

The prediction error or prediction residual $r=x-\hat{x}$ may be encoded using a separate distribution for each context, derived using information extracted from a representative training data set. Two special symbols may be used at both sides of the coding distribution 74, namely 76 and 78 to indicate out-of-range large negative or positive values, which are then encoded using an escape coding technique as already outlined above. For example, in accordance with an implementation example, $\min(|x-\hat{x}|-13; 15)$ is coded in the escape coding case, using four bits, and if $\min(|x-\hat{x}|-13; 15)$ equals 15, then $|x-\hat{x}|-13-15$ is coded, using another seven bits.

Figure 9:
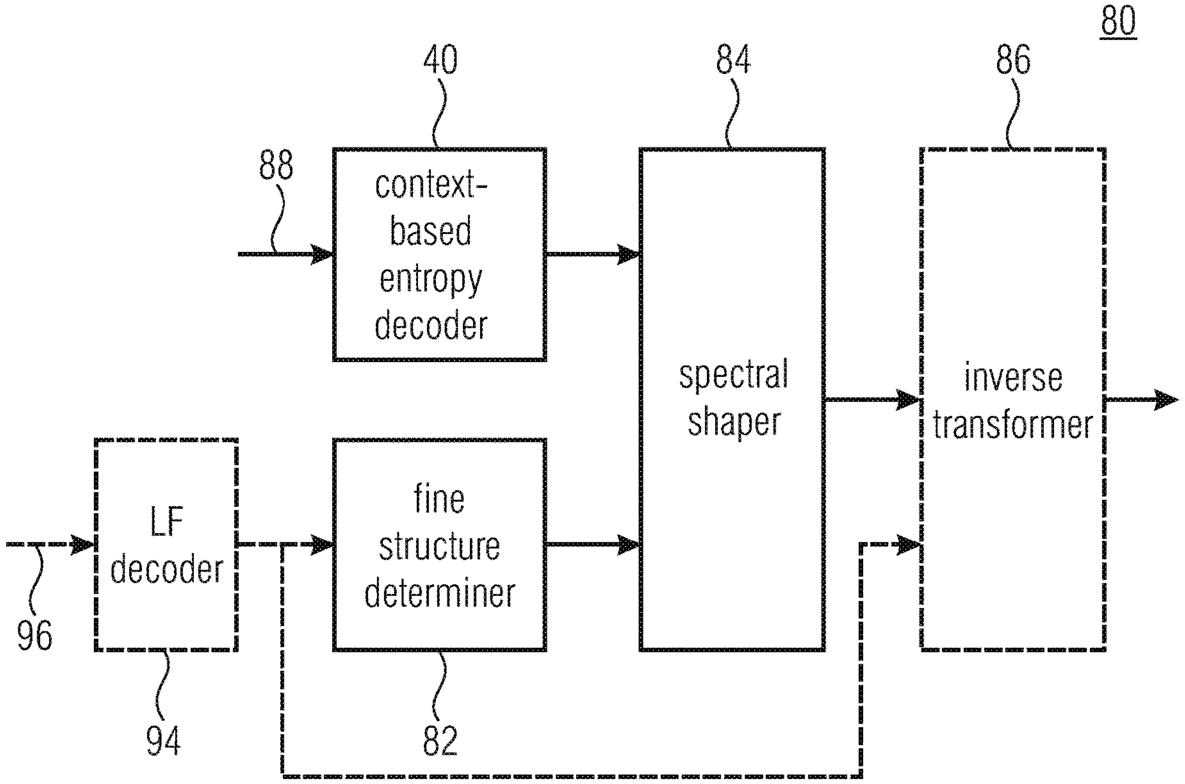
FIG. 9 shows a block diagram of a parametric audio decoder in accordance with an embodiment.

With respect to the following figures, various possibilities are described as to how the above mentioned context-based entropy encoders/decoders may be built into respective audio decoders/encoders. FIG. 9 shows, for example, a parametric decoder 80 into which a context-based entropy decoder 40 in accordance with any of the above outlined embodiments could be advantageously built into. The parametric decoder 80 comprises, besides context-based entropy decoder 40, a fine structure determiner 82 and a spectral shaper 84. Optionally, the parametric decoder 80 comprises an inverse transformer 86. The context based entropy decoder 40 receives, as outlined above, an entropy coded data stream 88 encoded in accordance with any of the above-outlined embodiments of a context-based entropy encoder. The data stream 88 accordingly has a spectral envelope encoded thereinto. The context-based entropy decoder 40 decodes, in a manner outlined above, the sample values of the spectral envelope of the audio signal which the parametric decoder 80 seeks to reconstruct. The fine structure determiner 82 is configured to determine a fine structure of a spectrogram of this audio signal. To this end, fine structure determiner 82 may receive information from outside, such as another portion of a data stream also comprising data stream 88. Further alternatives are described below. In another alternative, however, fine structure determiner 82 may determine the fine structure by itself using a random or pseudorandom process. The spectral shaper 84, in turn, is configured to shape the fine structure according to the spectral envelope as defined by the spectral values decoded by context-based entropy decoder 40. In other words, the inputs of spectral shaper 84 are connected to outputs of context-based entropy decoder 40 and fine structure determiner 82, respectively, in order to receive from same the spectral envelope on the one hand and the fine structure of the spectrogram of the audio signal, on the other hand, and the spectral shaper 84 outputs at its output the spectrogram's fine structure shaped according to the spectral envelope. The inverse transformer 86 may perform an inverse transform onto the shaped fine structure so as to output a reconstruction of the audio signal at its output.

Figure 10:
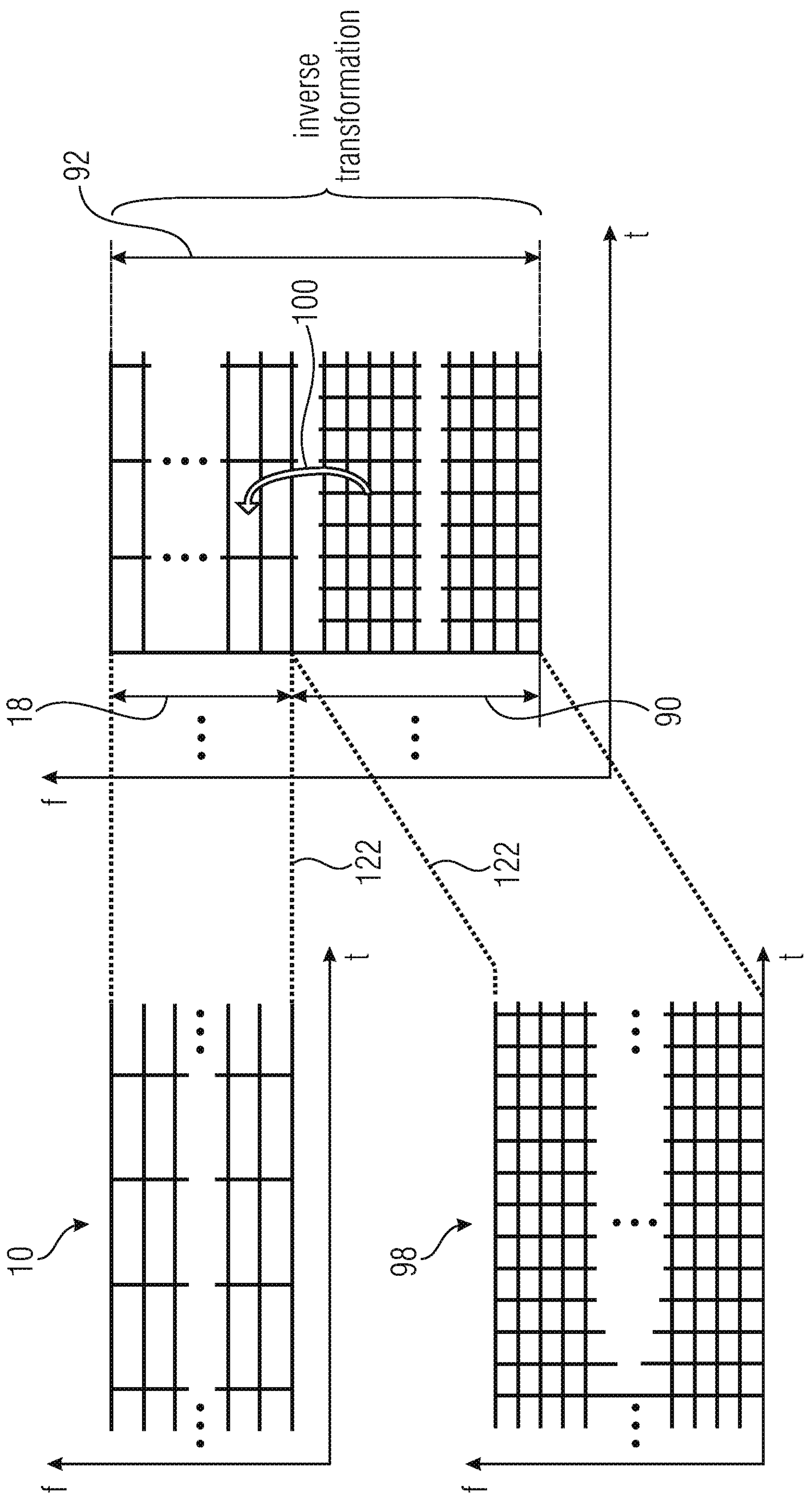
FIG. 10 shows a schematic illustrating a possible implementation variant of the parametric decoder of FIG. 9 by showing the relationship between the frequency interval covered by the spectral envelope on the one hand and the fine structure covering another interval of the overall audio signal's frequency range on the other hand.

In particular, the fine determiner 82 could be configured to determine the fine structure of the spectrogram using at least one of artificial random noise generation, spectral regeneration and spectral-line wise decoding using spectral prediction and/or spectral entropy-context derivation. The first two possibilities are described with respect to FIG. 10. FIG. 10 illustrates the possibility that the spectral envelope 10 decoded by context-based entropy decoder 40 pertains to a frequency interval 18 which forms a higher frequency extension of a lower frequency interval 90, i.e. interval 18 extends the lower frequency interval 90 towards higher frequencies, i.e. interval 18 borders interval 19 at the higher frequency side of the latter. Accordingly, FIG. 10 shows the possibility that the audio signal to be reproduced by parametric decoder 80 actually covers a frequency interval 92 out of which interval 18 merely represents a high frequency portion of the overall frequency interval 92. As shown in FIG. 9, parametric decoder 80 could, for example, additionally comprise a low frequency decoder 94 configured to decode a low frequency data stream 96 accompanying data stream 88 so as to obtain the low frequency band version of the audio signal at its output. The spectrogram of this low frequency version is depicted in FIG. using reference sign 98. Put together, this frequency version 98 of the audio signal and the shaped fine structure within interval 18 result in the audio signals reconstruction of the complete frequency interval 92, i.e. of its spectrogram across the complete frequency interval 92. As indicated by dashed lines in FIG. 9, the inverse transformer 86 could perform the inverse transform onto the complete interval 92. In this framework, the fine structure determiner 82 could receive the low frequency version 98 from decoder 94 in time-domain or frequency domain. In the first case, fine structure determiner 82 could subject the received low frequency version to a transformation to spectral domain so as to obtain spectrogram 98, and obtain the fine structure to be shaped by spectral shaper 84 according to the spectral envelope provided by context-based entropy decoder 40 using spectral regeneration as illustrated using arrow 100. However, as already outlined above, fine structure determiner 82 may not even receive the low frequency version of the audio signal from LF decoder 94, and generate the fine structure solely using a random or pseudorandom process.

Figure 11:
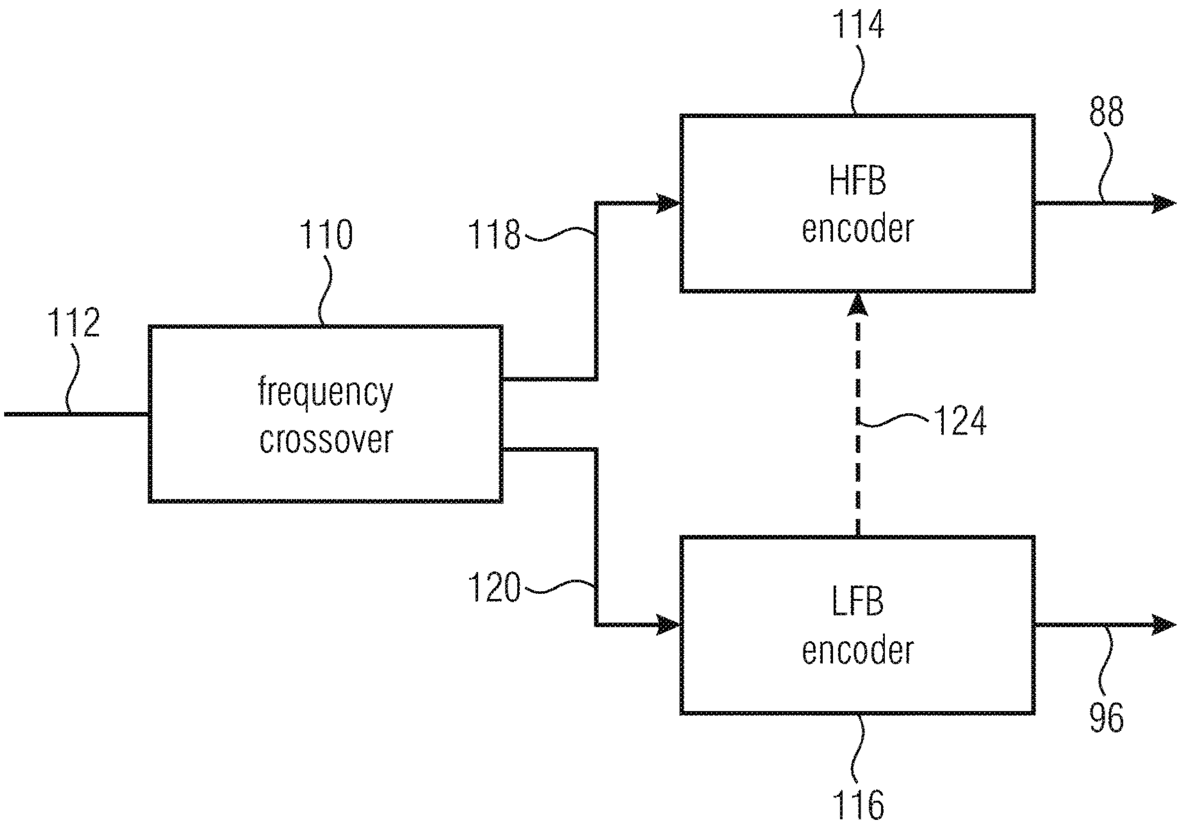
FIG. 11 shows a block diagram of an audio encoder fitting to the parametric audio decoder of FIG. 9 according to the variant of FIG. 10.

A corresponding parametric encoder fitting to the parametric decoder according to FIGS. 9 and 10 is depicted in FIG. 11. The parametric encoder of FIG. 11 comprises a frequency crossover 110 receiving an audio signal 112 to be encoded, a high frequency band encoder 114 and a low frequency band encoder 116. Frequency crossover 110 decomposes the inbound audio signal 112 into two components, namely into a first signal 118 corresponding to a high pass filtered version of an inbound audio signal 112, and a low frequency signal 120 corresponding to a low pass filtered version of inbound audio signal 112, where the frequency bands covered by high frequency and low frequency signals 118 and 120 border each other at some crossover frequency (compare 122 in FIG. 10). The low frequency band encoder 116 receives the low frequency signal 120 and encodes same into a low frequency data stream, namely 96, and the high frequency band encoder 114 computes the sample values describing the spectral envelope of the high frequency signal 118 within the high frequency interval 18. The high frequency band encoder 114 also comprises the above described context-based entropy encoder for encoding these sample values of the spectral envelope. The low frequency band encoder 116 may for example be a transform encoder and the spectrotemporal resolution at which low frequency band encoder 116 encodes the transform or spectrogram of the low frequency signal 120 may be greater than the spectrotemporal resolution at which the sample values 12 resolve the spectral envelope of the high frequency signal 118. Accordingly, high frequency band encoder 114 outputs, inter alias, data stream 88. As shown by a dashed line 124 in FIG. 11, low frequency band encoder 116 may output information towards high frequency band encoder 114 such as, for example, in order to control the high frequency band encoder 114 with respect to this generation of the sample values describing the spectral envelope, or at least with respect to the selection of the spectrotemporal resolution at which the sample values sample the spectral envelope.

Figure 12:
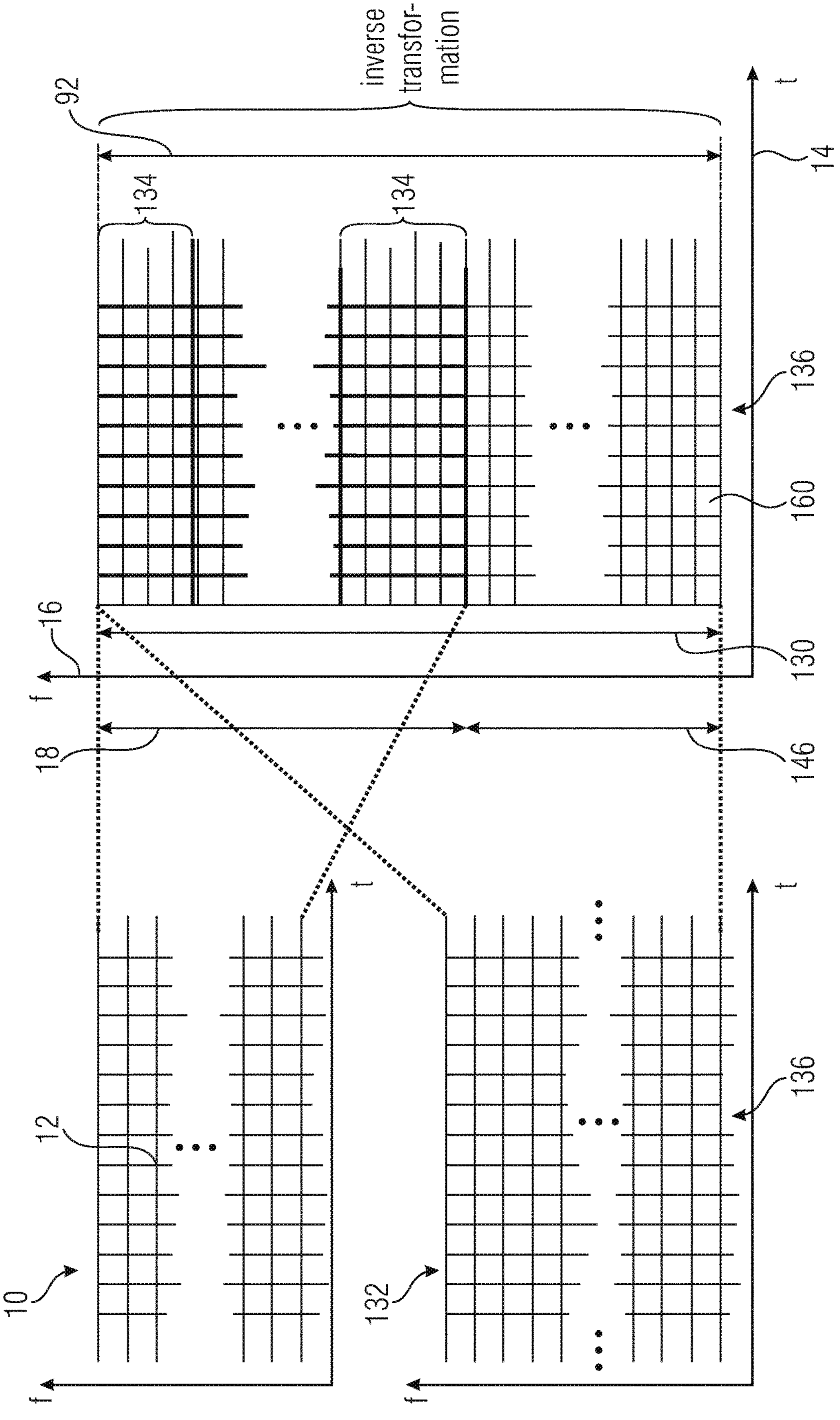
FIG. 12 shows a schematic diagram illustrating a variant of the parametric audio decoder of FIG. 9 when supporting IGF (Intelligent Gap Filling)

FIG. 12 shows another possibility of realizing the parametric decoder 80 of FIG. 9 and in particular the fine structure determiner 82. In particular, in accordance with the example of FIG. 12, the fine structure determiner 82 itself receives a data stream and determines, based thereon, the fine structure of the audio signals spectrogram using spectral-line wise decoding using spectral prediction and/or spectral entropy-context derivation. That is, the fine structure determiner 82 itself recovers from a data stream the fine structure in form of a spectrogram composed of a temporal sequence of spectrums of a lapped transform, for example. However, in the case of FIG. 12, the fine structure thus determined by fine structure 82 relates to a first frequency interval 130 and coincides with the complete frequency interval of the audio signal, i.e. 92.

In the example of FIG. 12, the frequency interval 18 which the spectral envelope 10 relates to, completely overlaps with interval 130. In particular, interval 18 forms a high frequency portion of interval 130. For example, many of the spectral lines within the spectrogram 132 recovered by fine structure determiner 82 and covering frequency interval 130, will be quantized to zero, especially within the high frequency portion 18. In order to nevertheless reconstruct the audio signal at high quality, even within the high frequency portion 18 at reasonable bitrate, parametric decoder 80 exploits the spectral envelope 10. The spectral values 12 of the spectral envelope 10 describe the audio signal's spectral envelope within high frequency portion 18 at a spectral temporal resolution which is coarser than the spectrotemporal resolution of the spectrogram 132 decoded by fine structure determiner 82. For example, the spectrotemporal resolution of the spectral envelope 10 is coarser in spectral terms, i.e. its spectral resolution is coarser than the spectral line granularity of the fine structure 132. As described above, spectrally, the sample values 12 of the spectral envelope 10 may describe the spectral envelope 10 in frequency bands 134 into which the spectral lines of spectrogram 132 are grouped for a scale-factor band-wise scaling of the spectral line coefficients, for example.

Figure 13:
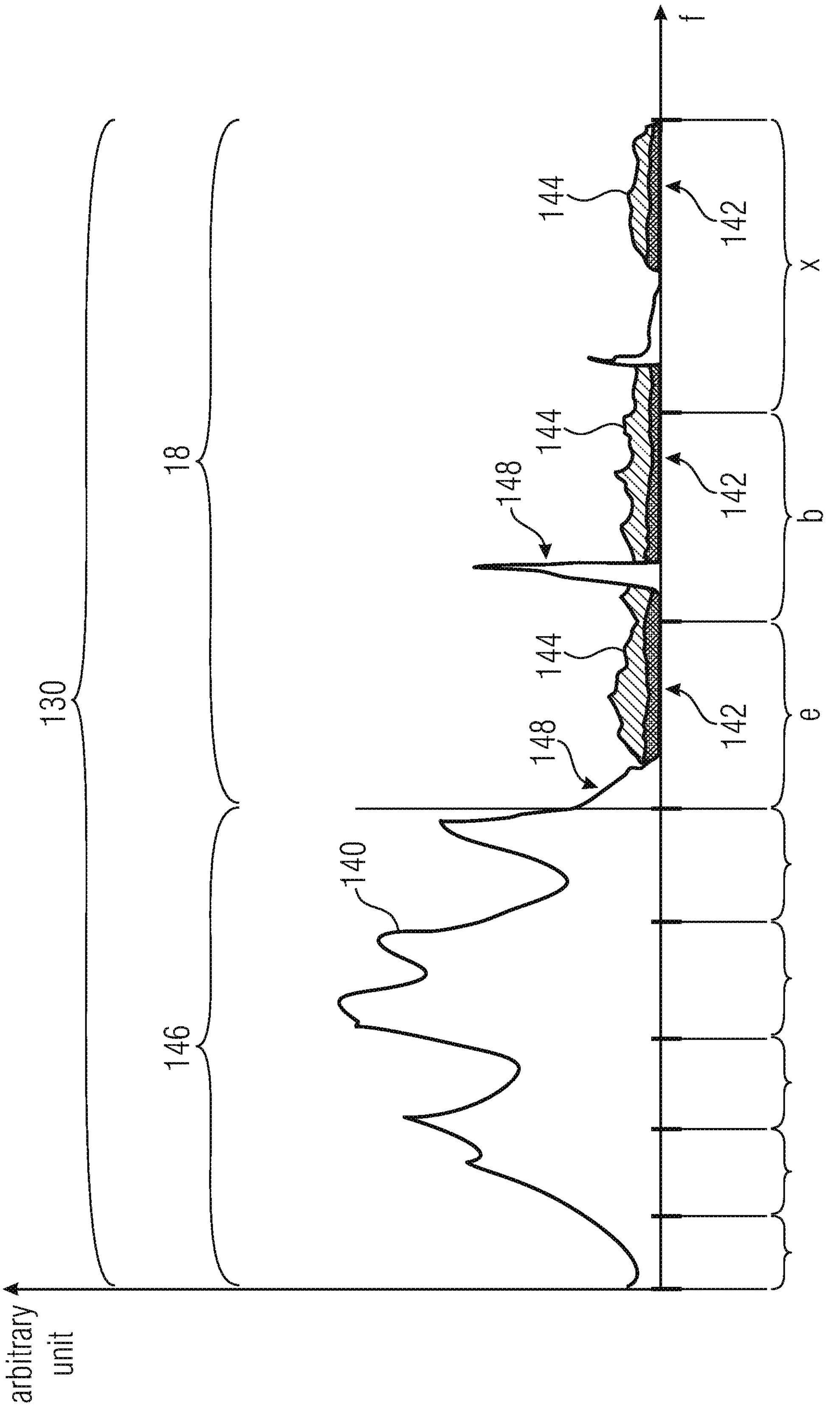
FIG. 13 shows a schematic diagram illustrating a spectrum out of a fine structure spectrogram, i.e. a spectral slice, the IGF filling of the spectrum and the shaping thereof in accordance with the spectral envelope in accordance with an embodiment.

The spectral shaper 84 could then, using the sample values 12, fill spectral lines within spectral line groups or spectrotemporal tiles corresponding to the respective sample values 12 using mechanisms like spectral regeneration or artificial noise generation, adjusting the resulting fine structure level or energy within the respective spectrotemporal tile/scale factor group according to the corresponding sample value describing the spectral envelope. See, for example, FIG. 13. FIG. 13 exemplarily shows a spectrum out of spectrogram 132 corresponding to one frame or time instant thereof, such as time instant 136 in FIG. 12. The spectrum is exemplarily indicated using reference sign 140. As illustrated in FIG. 13, some portions 142 thereof are quantized to zero. FIG. 13 shows the high frequency portion 18 and the subdivision of the spectrum's 140 spectral lines into scale factor bands indicated by curly brackets. Using "x" and "b" and "e", FIG. 13 illustrates exemplarily that three sample values 12 describe the spectral envelope within high frequency portion 18 in time instant 136—one for each scale factor band. Within each scale factor band corresponding to these sample values e, b and x, the fine structure determiner 82 generates fine structure within at least the zero-quantized portions 142 of spectrum 140, as illustrated by hatched areas 144, such as, for example, by spectral regeneration from the lower frequency portion 146 of the complete frequency interval 130, and then adjusting the energy of the resulting spectrum by scaling the artificial fine structure 144 according to, or using, sample values e, b and x. Interestingly, there are non-zero quantized portions 148 of spectrum 140 in-between or within the scale factor bands of high frequency portion 18, and accordingly, using the intelligent gap filling according to FIG. 12, it is feasible to position peaks within the spectrum 140 even in the high frequency portion 18 of the complete frequency interval 130 at spectral line resolution and at any spectral line position, with nevertheless having the opportunity to fill the zero quantized portions 142 using the sample values x, b and e for shaping the fine structure inserted within these zero quantized portions 142.

Figure 14:
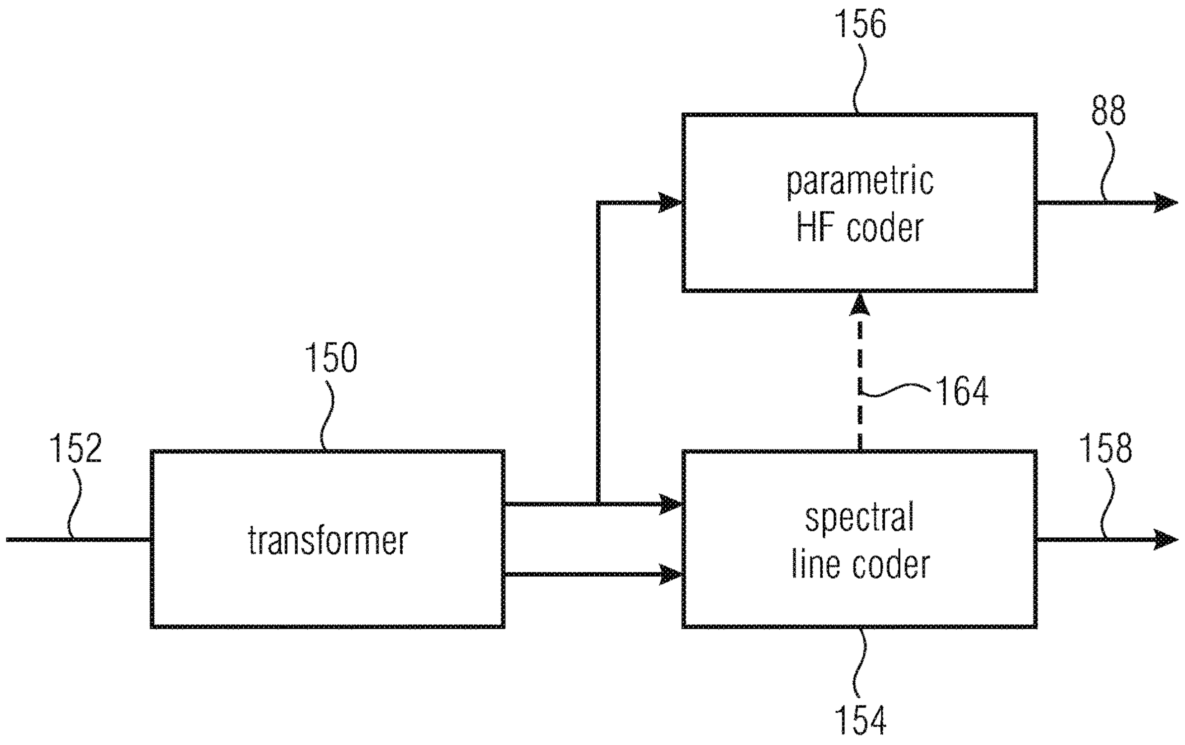
FIG. 14 shows a block diagram of an audio encoder supporting IGF, fitting to the variant of the parametric decoder of FIG. 9 in accordance with FIG. 12.

Finally, FIG. 14 shows a possible parametric encoder for feeding parametric decoder of FIG. 9 when embodied according to the description of FIGS. 12 and 13. In particular, in that case the parametric encoder may comprise a transformer 150 configured to spectrally decompose an inbound audio signal 152 into the complete spectrogram covering the complete frequency interval 130. A lapped transform with possibly varying transform length may be used. A spectral line coder 154 encodes, at spectral line resolution, this spectrogram. To this end, spectral line coder 154 receives both the high frequency portion 18 as well as the remaining low frequency portion from transformer 150, both portions gaplessly and without overlap covering the complete frequency interval 130. A parametric high frequency coder 156 merely receives the high frequency portion 18 of the spectrogram 132 from transformer 150, and generates at least data stream 88, i.e. the sample values describing the spectral envelope within the high frequency portion 18.

That is, in accordance with the embodiments of FIGS. 12 to 14, the audio signal's spectrogram 132 is coded into a data stream 158 by spectral line coder 154. Accordingly, spectral line coder 154 may encode one spectral line value per spectral line of the complete interval 130, per time instant or frame 136. The small boxes 160 in FIG. 12 show these spectral line values. Along the spectral axis 16, the spectral lines may be grouped into scale factor bands. In other words, frequency interval 16 may be subdivided into scale factor bands composed of groups of spectral lines. Spectral line coder 154 may select a scale factor for each scale factor band within each time instant so as to scale the quantized spectral line values 160 coded via data stream 158. At a spectrotemporal resolution which is at least coarser than the spectrotemporal grid defined by the time instances and spectral lines at which the spectral line values 160 are regularly arranged, and which may coincide with the raster defined by the scale factor resolution, the parametric high frequency coder 156 describes the spectral envelope within the high frequency portion 18. Interestingly, non-zero-quantized spectral line values 160, scaled according to the scale factor of the scale factor band they fall into, may be interspersed, at spectral line resolution, at any position within the high frequency portion 18, and accordingly they survive the high frequency synthesis at the decoding side within spectral shaper 84 using the sample values describing the spectral envelope within the high frequency portion, as fine structure determiner 82 and spectral shaper 84 restrict, for example, their fine structure synthesis and shaping to the zero-quantized portions 142 within the high frequency portion 18 of the spectrogram 132. Altogether, a very efficient compromise between bitrate spent on the one hand and quality obtainable on the other hand results.

As denoted by a dashed arrow in FIG. 14, indicated at 164, the spectral line coder 154 may inform the parametric high frequency coder 156 on, for example, the reconstructible version of spectrogram 132 as reconstructible from data stream 158, with a parametric high frequency coder 156 using this information, for example, to control the generation of the sample values 12 and/or the spectrotemporal resolution of the representation of the spectral envelope 10 by the sample values 12.

Summarizing the above, the above embodiments take advantage of the special properties of sample values of spectral envelopes, where in contrast to [2] and [3] such sample values represent average values of spectra lines. In all the embodiments outlined above, the transforms may use MDCT and accordingly, an inverse MDCT may be used for all inverse transforms. In any case, such sample values of spectral envelopes are much more "smooth" and linearly correlated to the average magnitude of the corresponding complex spectral lines. In addition, in accordance with at least some of the above embodiments, the sample values of the spectral envelope, called SFE values in the following, are indeed dB domain or more generally logarithmic domain, which is a logarithmic representation. This further improves the "smoothness" compared to the values in linear domain or power-law domain for the spectral lines. For example, in AAC the power-law exponent is 0.75. In contrast to [4], in at least some embodiments the spectral envelope sample values are in logarithmic domain and the properties and structure of the coding distributions is significantly different (depending on its magnitude, one logarithmic domain value typically maps to an exponentially increasing number of linear domain values). Accordingly, at least some of the above described embodiments take advantage of the logarithmic representation in the quantization of the context (a smaller number of contexts are typically present) and in encoding the tails of the distribution of in each context (the tails of each distribution are wider). In contrast to [2], some of the above embodiments additionally use a fixed or adaptive linear prediction in each context, based on the same data as used in computing the quantized context. This approach is useful in drastically reducing the number of contexts while still obtaining optimal performance. In contrast to, for example, [4], in at least some of the embodiments the linear prediction in logarithmic domain has a significantly different usage and significance. For example, it allows to perfectly predict constant energy spectrum areas and also both fade-in and fade-out spectrum areas of the signal. In contrast to [4], some of the above described embodiments use arithmetic coding which allows optimal coding of arbitrary distributions using information extracted from a representative training data set.

In contrast to [2], which also uses arithmetic coding, in accordance with the above embodiments, prediction error values are encoded rather than the original values. Moreover, in the above embodiments bit plane coding does not need to be used. Bit plane coding would, however, involve several arithmetic coding steps for each integer value. Compared thereto, in accordance with the above embodiments, each sample value of the spectral envelope could be encoded/decoded within one step including, as outlined above, the optional use of escape coding for values outside of the center of the whole sample value distribution, which is much faster.

Briefly summarizing the embodiment of a parameter decoder supporting IGF again, as described above with respect to FIGS. 9, 12 and 13, according to this embodiment, the fine structure determiner 82 is configured to use spectral-line wise decoding using spectral prediction and/or spectral entropy-context derivation so as to derive the fine structure 132 of the spectrogram of the audio signal within a first frequency interval 130, namely the complete frequency interval. Frequency-line wise decoding denotes the fact that the fine structure determiner 82 receives spectral line values 160 from a data stream arranged, spectrally, in spectral line pitch, thereby forming a spectrum 136 per time instant corresponding to a respective time portion. The use of spectral prediction could, for example, involve differential coding of these spectral line values along the spectral axis 16, i.e. merely difference to the immediately spectrally preceding spectral line value is decoded from the data stream and then added to this predecessor. Spectral entropy-context derivation could denote the fact that the context for entropy decoding a respective spectral line value 160 could depend on, i.e. could be additively selected based on, the already decoded spectral line values in the spectrotemporal neighborhood, or at least the spectral neighborhood, of the currently decoded spectral line value 160. In order to fill zero-quantized portions 142 of the fine structure, the fine structure determiner 82 may use artificial random noise generation and/or spectral regeneration. The fine structure determiner 82 performs this merely within a second frequency interval 18 which may, for example, be restricted to a high frequency portion of the overall frequency interval 130. Portions spectrally regenerated may be, for example, taken from the remainder frequency portion 146. The spectral shaper then performs the shaping of the fine structure thus obtained according to the spectral envelope described by the sample values 12 at the zero-quantized portions. Notably, the contribution of the non-zero quantized portions of the fine structure within interval 18 to the result of the fine structure after shaping is independent from the actual spectral envelope 10. This means the following: either the artificial random noise generation and/or spectral regeneration, i.e. the filling, is restricted to the zero-quantized portions 142 completely, so that in the final fine structure spectrum merely portions 142 have been filled by artificial random noise generation and/or spectral regeneration using spectral envelope shaping, with the non-zero contributions 148 remaining as they are, interspersed between portions 142, or alternately all the artificial random noise generation and/or spectral regeneration result, namely the respective synthesized fine structure is also, in an additive manner, laid over portions 148, with then shaping the resulting synthesized fine structure according to the spectral envelope 10. However, even in that case, the contribution by way of the non-zero quantized portions 148 of the originally decoded fine structure is maintained.

With regard to the embodiment of FIGS. 12 to 14, it is finally noted that the IGF (Intelligent Gap Filling) procedure or concept described with respect to these figures, significantly improves the quality of an encoded signal even at very low bitrates, where a significant part of the spectrum in the high frequency region 18 is quantized to zero due to typically insufficient bit budget. In order to preserve as much as possible the fine structure of the upper frequency region 18, the IGF information, the low frequency region is used as a source to adaptively replace the destination regions of the high frequency region which were mostly quantized to zero, i.e. regions 142. An important requirement in order to achieve a good perceptual quality is matching of the decoded energy envelope of the spectral coefficients with that of the original signal. To achieve this, average spectral energies are calculated on spectral coefficients from one or more consecutive AAC scale factor bands. The resulting values are the sample values 12 describing the spectral envelope. Computing the averages using boundaries defined by scale factor bands is motivated by the already existing careful tuning of those boundaries to fractions of the critical bands, which are characteristic to human hearing. The average energies may be converted, as described above, into a logarithmic, such as a dB scale representation using a formula which may, for example, be similar to the one already known for the AAC scale factors, and then uniformly quantized. In IGF, different quantization accuracy may be optionally used depending on the requested total bitrate. The average energies constitute a significant part of the information generated by IGF, so its efficient representation within data stream 88 is very important for the overall performance of the IGF concept.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a hard disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] International Standard ISO/IEC 14496-3:2005, Information technology—Coding of audio-visual objects—Part 3: Audio, 2005.

[2] International Standard ISO/IEC 23003-3:2012, Information technology—MPEG audio technologies—Part 3: Unified Speech and Audio Coding, 2012.

[3] B. Edler and N. Meine: Improved Quantization and Lossless Coding for Subband Audio Coding, AES 118th Convention, May 2005.

[4] M. J. Weinberger and G. Seroussi: The LOCO-I Lossless Image Compression Algorithm: Principles and Standardization into JPEG-LS, 1999. Available online at http://www.hpl.hp.com/research/info_theory/loco/HPL-98-193R1.pdf

The invention claimed is:

1. Parametric decoder configured to decode a spectral envelope of an audio signal by spectrotemporally predicting a current sample value of the spectral envelope to acquire an estimated value of the current sample value;

determining a context for the current sample value dependent on a measure for a deviation between a pair of already decoded sample values of the spectral envelope in a spectrotemporal neighborhood of the current sample value;

entropy decoding a prediction residual value of the current sample value using the context determined; and combining the estimated value and the prediction residual value to acquire the current sample value, and spectrally shape a spectrogram of the audio signal according to the spectral envelope, wherein the parametric audio decoder is configured to determine the spectrogram using spectral prediction and/or spectral entropy-context derivation.

2. Parametric decoder according to claim 1, further configured to perform the spectrotemporal prediction by linear prediction.

3. Parametric decoder according to claim 1, further configured to use a signed difference between the pair of already decoded sample values of the spectral envelope in the spectrotemporal neighborhood of the current sample value as to measure the deviation.

4. Parametric decoder according to claim 1, further configured to determine the context for the current sample value dependent on a first measure fora deviation between a first pair of already decoded sample values of the spectral envelope in the spectrotemporal neighborhood of the current sample value and a second measure for a deviation between a second pair of already decoded sample values of the spectral envelope in the spectrotemporal neighborhood of the current sample value, with the first pair neighboring each other spectrally, and the second pair neighboring each other temporally.

5. Parametric decoder according to claim 4, further configured to spectrotemporally predict the current sample value of the spectral envelope by linearly combining the already decoded sample values of the first and second pairs.

6. Parametric decoder according to claim 5, further configured to set factors of the linear combination so that the factors are the same for different contexts, in case of the bitrate at which the audio signal is coded being greater than a predetermined threshold, and the factors are set individually for the different contexts, in case of the bitrate being lower than the predetermined threshold.

7. Parametric decoder according to claim 1, further configured to, in decoding the sample values of the spectral envelope, sequentially decode the sample values using a decoding order which traverses the sample values time instant by instant with, in each time instant, leading from lowest to highest frequency.

8. Parametric decoder according to claim 1, further configured to, in determining the context, quantize the measure for the deviation and determine the context using the quantized measure.

9. Parametric decoder according to claim 8, further configured to use a quantization function in the quantization of the measure for the deviation, which is constant for values of the measure for the deviation outside a predetermined interval, the predetermined interval comprising zero.

10. Parametric decoder according to claim 9, wherein the values of the spectral envelope are represented as integer numbers and the length of the predetermined interval is smaller than, or equal to, 1/16 of the number of representable states of an integer representation of the values of the spectral envelope.

11. Parametric decoder according to claim 1, further configured to transfer the current sample value, as derived by the combination, from a logarithmic domain to a linear domain.

12. Parametric decoder according to claim 1, managing a number of contexts, each context having a probability distribution associated therewith which assigns to each possible value of the prediction residual value a respective probability, further configured to, in entropy decoding the prediction residual values, sequentially decode the sample values along a decoding order and use a set of context-individual probability distributions, which is constant during sequentially decoding the sample values of a spectral envelope.

13. Parametric decoder according to claim 1, further configured to, in entropy decoding the prediction residual value, use an escape coding mechanism in case the prediction residual value is outside a predetermined value range.

14. Parametric decoder according to claim 13, Wherein the sample values of the spectral envelope are represented as integer numbers, and the prediction residual value is represented as an integer number.

15. Method for parametric decoder comprising:

decoding a spectral envelope of an audio signal by spectrotemporally predicting a current sample value of the spectral envelope to acquire an estimated value of the current sample value;

determining a context for the current sample value dependent on a measure for a deviation between a pair of already decoded sample values of the spectral envelope in a spectrotemporal neighborhood of the current sample value;

entropy decoding a prediction residual value of the current sample value using the context determined; and combining the estimated value and the prediction residual value to acquire the current sample value and spectrally shaping a spectrogram of the audio signal according to the spectral envelope, wherein the method comprises determining the spectrogram using spectral prediction and/or spectral entropy-context derivation.

16. Non-transitory computer-readable storage medium storing a computer program having a program code for performing, when running on a computer, a method according to claim 15.

* * * * *